US012705598B2

(12) United States Patent
Blazevige

(10) Patent No.: US 12,705,598 B2
(45) Date of Patent: Aug. 11, 2026

(54) LOCALIZED SMART CONTRACT BANKING SYSTEM AND METHOD

(71) Applicant: The Precision Resource Group, LLC, Lewes, DE (US)

(72) Inventor: Antonio Blazevige, Hillsborough, NJ (US)

(73) Assignee: The Precision Resource Group, LLC

( * ) Notice: Subject to any disclaimer, the term of this patent is extended or adjusted under 35 U.S.C. 154(b) by 54 days.

(21) Appl. No.: 18/444,799

(22) Filed: Feb. 19, 2024

(65) Prior Publication Data

US 2024/0232849 A1 Jul. 11, 2024

Related U.S. Application Data

(63) Continuation-in-part of application No. 17/988,781, filed on Nov. 17, 2022, now abandoned, which is a continuation of application No. 15/592,293, filed on May 11, 2017, now abandoned.

(60) Provisional application No. 62/334,491, filed on May 11, 2016.

(51) Int. Cl.

| | |
|---|---|
| ***G06Q 20/20*** | (2012.01) |
| ***G06Q 20/10*** | (2012.01) |
| ***G06Q 20/32*** | (2012.01) |

(52) U.S. Cl.
CPC ....... *G06Q 20/3221* (2013.01); *G06Q 20/108* (2013.01); *G06Q 20/20* (2013.01)

(58) Field of Classification Search
CPC ... G06Q 20/3221; G06Q 20/108; G06Q 20/20
USPC .......................................................... 705/42
See application file for complete search history.

(56) References Cited

U.S. PATENT DOCUMENTS

| | | | | |
|---|---|---|---|---|
| 2008/0294536 A1* | 11/2008 | Taylor | G06Q 10/087 | 705/28 |
| 2015/0379510 A1* | 12/2015 | Smith | G06F 21/64 | 705/71 |
| 2017/0132621 A1* | 5/2017 | Miller | H04L 9/0861 | |
| 2018/0117446 A1* | 5/2018 | Tran | G06F 1/163 | |

* cited by examiner

*Primary Examiner* — Bennett M Sigmond
*Assistant Examiner* — Michael J Warden
(74) *Attorney, Agent, or Firm* — Gearhart Law LLC

(57) ABSTRACT

A localized smart contract banking system including a local banking hub located at each of a plurality of individual merchant facilities, a private wireless network implemented by each of the local banking hubs and providing for communication between local banking hubs located at neighboring merchant facilities within range of the private wireless networks, a local gateway installed at specific local banking hubs providing access to a wide area network, a cloud management hub communication with the specific local banking hubs over the wide area network, and a mobile smartphone type device communicating directly with a local banking hub via the private wireless network and with the cloud management hub via the cellular interface.

15 Claims, 15 Drawing Sheets

100
130
131
132
133
134
135
140
141
110
111
112
113
120
121
122
123
124
150
150
160
160 localized smart contracts banking system
910 header section
920

*FIG. 9* localized smart contracts banking system 1110 key section 1120

*FIG. 11* localized smart contracts banking system
1310 individual smart contract transactions
1320

*FIG. 13* localized smart contracts banking system
1400 targeted advertising
1402

*FIG. 14* localized smart contracts banking system
1500 smart contract
1502

*FIG. 15*

LOCALIZED SMART CONTRACT BANKING SYSTEM AND METHOD

RELATED APPLICATIONS

The present application is a U.S. Continuation-In-Part Application entitled, "LOCALIZED SMART CONTRACT BANKING SYSTEM AND METHOD" which claims priority to co-pending U.S. Continuation patent application Ser. No. 17/988,781 which was filed Nov. 17, 2022 entitled, "LOCALIZED SMART CONTRACT BANKING SYSTEM AND METHOD" which is a continuation of U.S. patent application Ser. No. 15/592,293 which was filed on May 11, 2017, which claims priority to U.S. provisional application No. 62/334,491 filed on May 11, 2016 for a LOCALIZED SMART CONTRACT BANKING SYSTEM AND METHOD, which are incorporated herein by reference in its entirety for all purposes.

FIELD OF THE INVENTION

The present disclosure relates generally to a localized smart contract banking system and method.

BACKGROUND

In the 21st Century banking has become a part of everyday life with the integration and implementation of various types of technologies. Mobile banking, or banking done on mobile communication devices, is on the rise and its wide acceptance has helped to create a new demand for innovative financial technology products. Within financial technology is the payments industry and it has seen a small group of incumbents dominate the market for the better part of three decades, or from the inception of plastic credit and debit cards. Only recently has post financial crisis legislation and regulatory agenda forced traditional payment incumbents to innovate and develop new products that mainly focus on increasing security and reliability. Although innovation has occurred in form it has failed to yield any real change in the value structure of the payments system. The existing payments industry relies on the digital networks created as a result of the integration of multiple independent processing companies in order to complete a single electronic transaction. These companies are self-interested which is evidenced by the fact that they have yet to, and may never deliver value-based innovation that benefits merchants and consumers alike. Furthermore, security and the awareness of the need to continuously upgrade it has been all but consistent. This is evidenced by the fact that EMV or chip-enabled credit cards have only recently come to the United States yet it is widely known in Europe that criminals have been able to exploit their security flaws for more than five years. Summarily the centralized nature of payment processors and their systems serves to increase the public's reliance at a great cost. The invention in its current implementation ensures merchants and consumers can interact directly and securely without the need for a centralized banking server to approve and complete individual electronic transactions.

BRIEF SUMMARY

The above-recited needs being addressed with an exemplary embodiment of a localized smart contract banking system, comprising: a local banking hub located at each of a plurality of individual merchant facilities, a private wireless network implemented by each of the local banking hubs and providing for communication between local banking hubs located at neighboring merchant facilities within range of the private wireless networks, a local gateway installed at specific local banking hubs, the local gateway providing access to a wide area network, a cloud management hub, the cloud management hub including a local gateway providing access to the wide area network and a cellular network and communication with the specific local banking hubs over the wide area network, a mobile smartphone type device including a wireless network interface and a wireless cellular interface, the mobile smartphone device communicating directly with a local banking hub via the wireless network interface and communicating with the cloud management hub via the cellular interface, the mobile smartphone device storing locally a smart contract file associated with that specific mobile smartphone type device and used as a programmatic method to purchase goods and services from the individual merchant facilities, the local banking hub facilitating the creation of the smart contract file and the processing of transactions involved in the purchase of goods and services at the individual merchant facility using the smart contract as a programmatic method to securely transfer value, and the cloud management hub administrating the creation and verification of smart contracts associated with a specific mobile smartphone type devices across the individual local banking hubs.

The above-recited needs being similarly addressed with an exemplary embodiment of a method for implementing a localized smart contract banking system, the method steps comprising: a point-of-sale terminal totaling the amount of a purchase to be made at a member merchant facility, a smartphone type device wirelessly discovering and communicating with the point-of-sale terminal, the smartphone type device selecting a locally stored smart contract file to implement a programmatic method to securely transfer value for the purchase, the point-of-sale terminal validating the smartphone type device using public and private key pairs retrieved from a key section of the selected smart contract file, the point-of-sale terminal retrieving specific ledger entries from a blockchain ledger stored in a ledger section of the selected smart contract file, the ledger entries representing previous implementations of the programmatic method using the selected smart contract file, the point-of-sale terminal validating the selected smart contract file by comparing the received blockchain ledger entries to their corresponding blockchain ledger entries in a locally stored blockchain ledger of all implementation of the programmatic method in a defined geographic region or to a locally stored blockchain ledger of all implementation of the programmatic method across all defined geographic regions, the point-of-sale terminal requesting a copy of the validated smart contract file from the smartphone type device, the point-of-sale terminal amending the ledger section of the validated smart contract file to include a blockchain hash of the purchase, and the point-of-sale terminal wireless transiting the amended smart contract file to the smartphone type device where it is locally stored. The delivery of interactive multimedia events after smart contract transaction.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 9 is a block diagram illustrating the localized smart contracts banking system, according to some embodiments of the present disclosure.

FIG. 11 is a block diagram illustrating the localized smart contracts banking system, according to some embodiments of the present disclosure.

FIG. 13 is a block diagram illustrating the localized smart contracts banking system, according to some embodiments of the present disclosure.

FIG. 14 is a block diagram illustrating the localized smart contracts banking system, according to some embodiments of the present disclosure.

FIG. 15 is a block diagram illustrating the localized smart contracts banking system, according to some embodiments of the present disclosure.

DETAILED DESCRIPTION

An exemplary embodiment of a localized smart contract banking system and method is disclosed. As required, detailed embodiments of the disclosed system and method are disclosed herein however, it is to be understood that the disclosed embodiments are merely exemplary of the invention that may be embodied in various and alternative forms. The figures are not necessarily to scale and some features may be exaggerated or minimized to show details of particular components. Therefore, the structural and functional details disclosed herein are not to be interpreted as limiting, but merely as representative for teaching one of ordinary skill in the art to variously employ the present disclosure.

Figure 1:
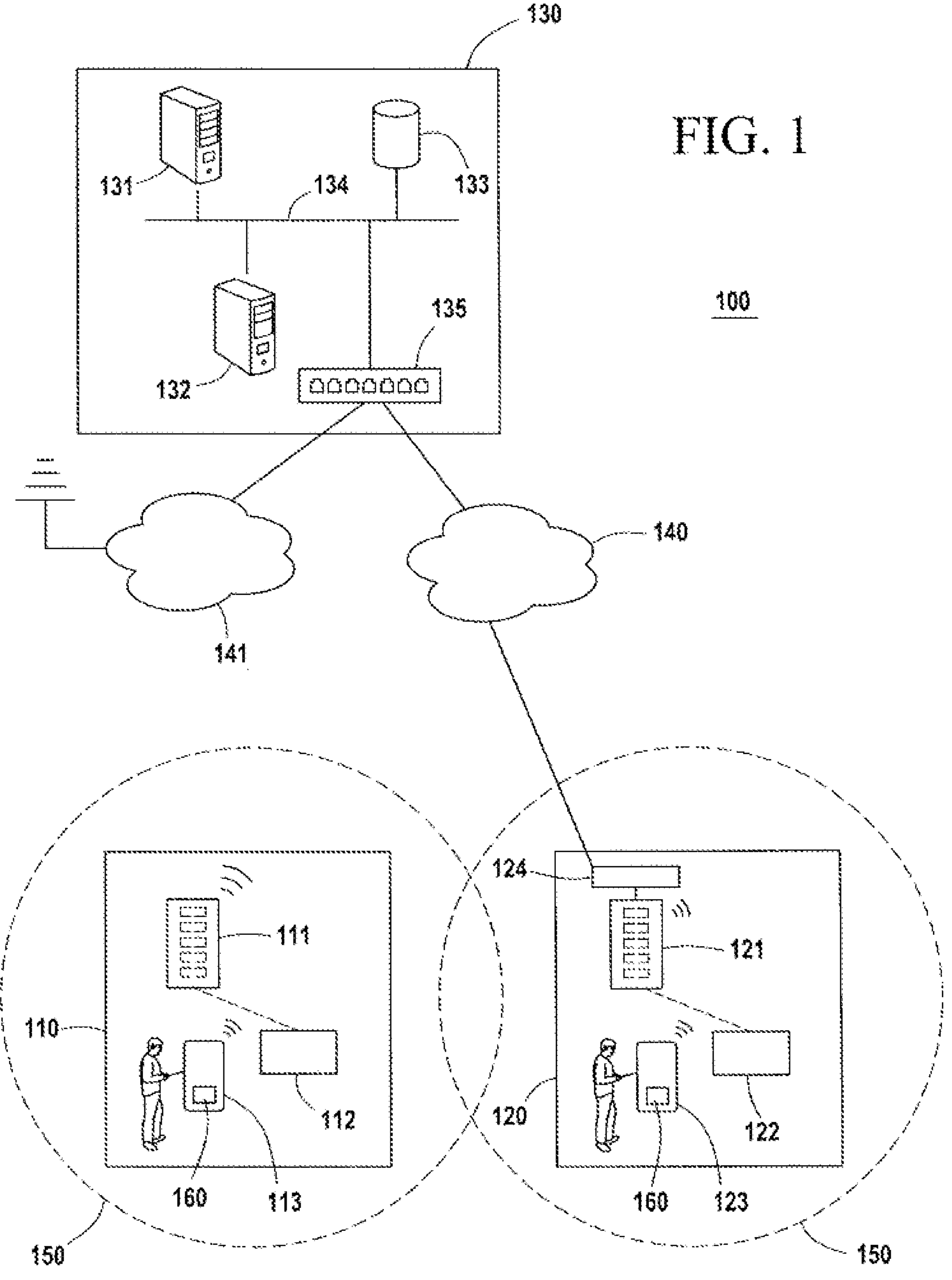
FIG. 1 is a conceptual diagram of a localized smart contract banking system according to an exemplary embodiment.

In FIG. 1, a conceptual diagram of a localized digital smart contract system according to an exemplary embodiment is depicted. As shown in FIG. 1, the localized smart contract banking system 100 includes a plurality of local banking hubs 110, 120 and a cloud management hub 130. The plurality of local banking hubs 110, 120 communicating with each other over a private wireless network 150. The cloud management hub 130 communicating with selected local banking hubs 110, 120 over an open Internet connection 140 via a network gateway device 124 located at select local banking hubs 120. The cloud management hub 130 may also communicate wirelessly over the cellular network connection 141.

A local banking hub 110, 120 includes an in-store banking server 111, 121 and a point-of-sale payment terminal 112, 122. The in-store banking server 111, 121 implements a private wireless network 150 that provides for communication with a local point-of-sale terminal 112, 113 and with other local banking hubs 110 within range of the private wireless network 150. Local banking hubs 110, 120 are installed in participating retail establishments that service neighborhoods, shopping centers, malls or any other relevant environment. Customers regularly visit participating merchant establishments to purchase goods and/or services using a local banking hub 110, 120 installed at each of the participating retail establishments.

A customer purchases goods and/or services at a participating retail establishment using a customer application 160 implemented on a smartphone type device 113, 123. The customer application 160 communicates wirelessly with a local in-store banking server 111, 121 and a point-of-sale payment terminal 112, 122 over the private wireless network 150 using the wireless interface(s) of the smartphone type device 113,123. Moreover, the customer application 160 may communicate with the cloud management hub 130 using the cellular interface of the smartphone type device 113, 123. The point-of-sale terminal 112, 122 and in-store banking server 111, 121 are shown as separate units in this disclosed exemplary embodiment, however one of ordinary skill in the art will understand that the functionality of each of these devices may also be incorporated into a single unit.

The in-store banking servers 111, 121 provides for the collection and storage of coin and paper currency, the conversion of collected coin and paper currency into discreet cryptographic tokens embedded with a smart contract, the processing of smart contract based transactions, and the delivery of unique, discrete and interactive targeted multimedia advertising events.

The cryptographic tokens embedded within a smart contract are proprietary to the local banking system 100 of the present disclosure and for use exclusively at participating establishments having a point-of-sale terminal 112,122.

Targeted multimedia advertisements are delivered to the smartphone type devices 113, 123 of participating customers from the cloud management hub 130 over either the private wireless network 150 or the cellular interface of the smartphone type device 113, 123.

The point-of-sale terminals 112, 122 receive and then transmit transactional data to in-store banking servers 111, 121 and to smartphone type devices 113, 122 relating to a customer's purchases at participating merchant establishments. The point-of-sale terminals 112, 122 interact with the local banking application 160 on a customer's smartphone type device 113, 123 in order to confirm and process smart contract based transactions stored on smartphone type devices 113, 123. All transactional data between the point of sale terminal, the in-store banking server and a customer's smartphone type device 113, 123 are communicated wirelessly over the private wireless network 150, or directly from machine to machine.

As one of ordinary skill in the art will understand, the point-of-sale terminals 112, 122 and the in-store banking servers 111, 121 may be designed to interact with multiple types of devices simultaneously other than the smartphone type device 113, 123 in use while remaining within the scope of the present invention, including but not limited to use of radio frequency identification devices, Bluetooth radio devices and other wireless communication methods that use visible or invisible light, audible or inaudible sound to communicate directly from device to device including, but not limited to, light fidelity (Li-Fi) technology and ultra-high frequency or UHF communication protocols.

Returning to FIG. 1, an in-store banking server 111, 121 at a particular participating merchant establishment may include a network gateway device 124 that provides access to an Internet connection 140, this connection providing the in-store banking server 121 access to the cloud management hub 130 via the Internet 140.

The cloud management hub 130 includes a management server 131, a smart contract generation server 132, a local database 133 and a local area network 134 that interconnects the servers 131, 132 and the local database 133 as well as providing access to the Internet 140 and cellular networks 141 via a network gateway device 135.

The cloud management hub 130 manages customer payment accounts stored in the database 133 and processes smart contract based transactions received from in-store banking servers 111, 121, point-of-sale terminals 112, 122 and customer smartphone type devices 113, 123.

The smart contract generation server 132 generates, stores and manages anonymized data used to identify a customer's smartphone type device 113, 123 and delivers targeted advertisements sponsored by advertising subsidiaries and partners. The data managed by the smart contract generator is accessed in a non-attributable manner using a table of keys for reference. This ensures that a customer's identity is not linked to the transactions they participate in and is not linked to either the goods and/or services they purchase, the activities they engage in, or the targeted advertisements they interact with on the smartphone type device 113, 123.

A smart contract in the present disclosure is a means for efficiently and securely processing financial transactions using digital cryptographic tokens within the closed banking system of the present disclosure. A smart contract is embodied as a file that contains at least a header section, a key section, and a ledger section.

The header section contains at least a time-stamp identifying the local time when the file was last accessed, a geo-stamp identifying the location where the file was last accessed and possibly other uniquely identifiable information relevant to that smart contracts' provenance, or history, to include with whom a smart contract may have been custodied, in what ways and how many times the smart contract has been updated since its inception, or from what sponsor, or third party it was created. Geographic information within the header section may also be used to work in augmented reality where global positioning information of a smart contract would anchor the smart contract's interaction within the banking system.

The key section contains public and private key components which define allowed processing and which summarize the events which implemented the allowed processing. The number and type of public and private key pairs may be adjusted and customized, as needed depending on specific transaction types. As exemplary listing of the key pairs and their respective function are described in the following table.

| Key Pair Types | Description |
|---|---|
| Phone Key | Enables and identifies processing of smart contract on a designated smartphone type device. |
| Point-of-Sale Terminal Key | Enables and identifies processing of smart contract on a point-of-sale terminal. |
| GPS Key | Enables and identifies processing of smart contract conditioned on GPS information. |
| Third Party Key | Enables and identifies processing of smart contract by a defined third party. |
| Separate Party Key | Enables and identifies processing of smart contract by a specific party. |
| Master Public Key | Enables validation of smart contract. |
| Partner Key | Enables validation and identification of specific retail partner. |
| Value Add and Subtract Key | Enables processing of smart contract to add or subtract monetary value. |

The ledger section includes a hash table populated by ledger entries defining individual smart contract transactions. The extent of the ledger entries included within the ledger section of a particular smart contract depends on which device within the system has access to that smart contract file. A smart contract residing and managed on a participating customer's smartphone type devices 113,123 will include a ledger whose entries reflect only that customer's transaction history and the nodes those transactions interacted with. A smart contract residing and managed within a localized banking hub may include a ledger whose entries originate from many nodes or locations within the network and should reflect all smart contract transactions that have occurred within its defined geographic area of responsibility. Of course, a smart contract residing and managed within a cloud management hub may include a ledger whose entries from numerous nodes reflect transactions from multiple or all of the defined geographic regions.

In this exemplary embodiment, the geographic enabled smart contract file is described as interfacing with a point-of-sale terminal during the purchase of goods and services. However, the geographic smart contract may also interact with any trusted smart device to accomplish the same functionality.

Figure 2:
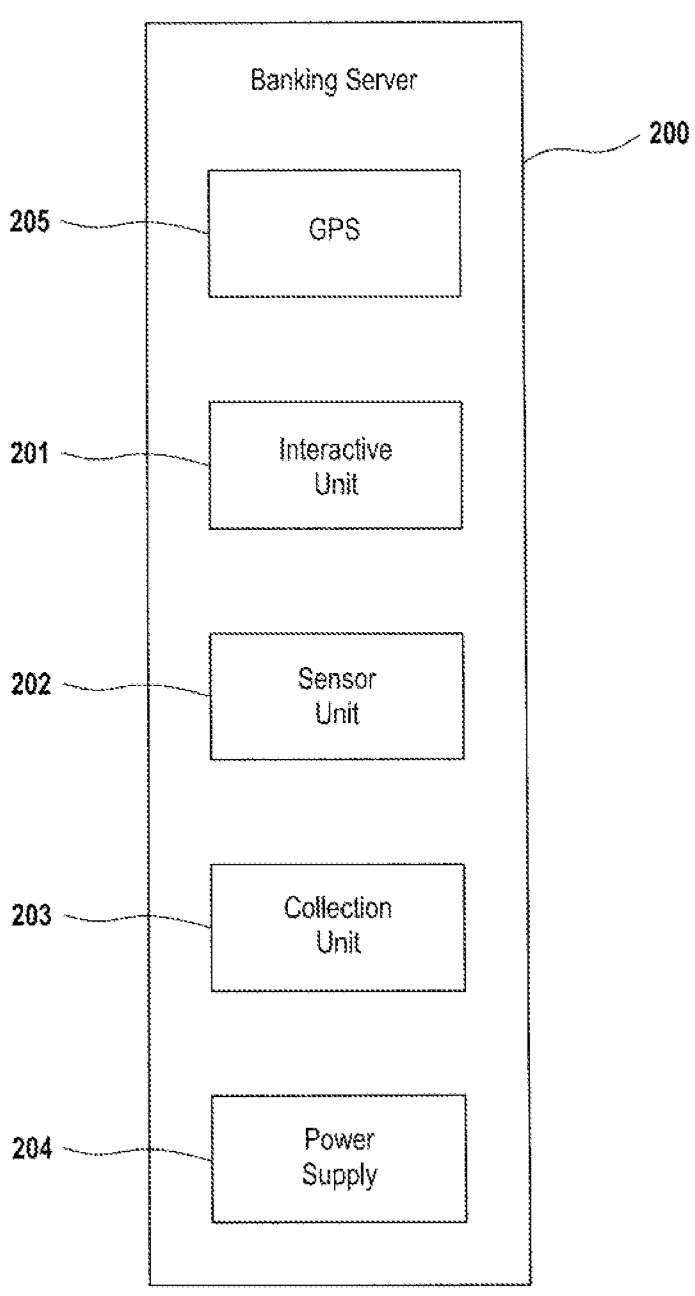
FIG. 2 is a conceptual diagram of an in-store banking server according to an exemplary embodiment.

In FIG. 2, a conceptual diagram of an in-store banking server according to an exemplary embodiment is depicted. As shown in FIG. 2, the in-store banking server 200 is comprised at least of an interactive unit 201, a sensor unit 202, a coin and paper money collection and dispensing unit 203, a power supply unit 204, and a global positioning system units (205).

The interactive unit 201 includes those components necessary to enable interaction with participating customers and merchants. These components will include at least a central processing unit, memory and secure local storage. These components may further include a touchscreen display, a keypad, a paper bill validator, a magnetic strip credit-card processing unit, and a bulk coin acceptor and dispenser. A vibration sensing piezoelectric crystal, a microphone, a speaker and a light emitting diode LED.

The sensor unit 202 includes those components necessary to enable wireless communication over a closed and private wireless network between the in-store banking server 200 and smartphone type devices 113, 123 within range of the private wireless network 150. The closed and private network 150 may also allow for communication between neighboring local banking hubs whose private wireless networks are within range of each other. The closed and private wireless networks between neighboring local banking hubs provides for the sharing and relaying of information between neighboring in-store banking servers 200. As a result, an in-store banking server 200 at a first merchant location 110 may approve and process a smart contract transaction at a neighboring second merchant location 120 for a customer whose smart contract account resides on the in-store banking server 200 at the first merchant location without having to immediately communicate with the cloud management hub 130.

The coin and paper money collection unit 203 securely stores and organizes fiat currency, which has been deposited by customers and for which value is added to that customer's smart contract account.

The power supply unit 204 includes those components necessary to provide power to all the units within the in-store banking unit 200 as a whole under normal operating conditions. The power supply unit 204 may include a battery backup unit capable of providing power to the in-store banking server 200 for a limited time if there is a power interruption. The power supply unit 204 may further include a power conditioner, fuses, relays and other general electronic hardware components.

The GPS unit 205 provides for the creation of location based geo-stamp which may be securely integrated into a smart contract to restrict or grant approval as to where a transaction based on that smart contract's geo-parameters may occur, with which devices it may occur with, and in some cases to whom or from whom value may be transferred relative to location and time. The geo-stamp may be used in the header section of smart contract files for quick reference database functions. Further, the geo-stamp may also be used to confirm that an in-store server requesting the processing of a transaction has not been physically moved from its proper location.

Figure 3:
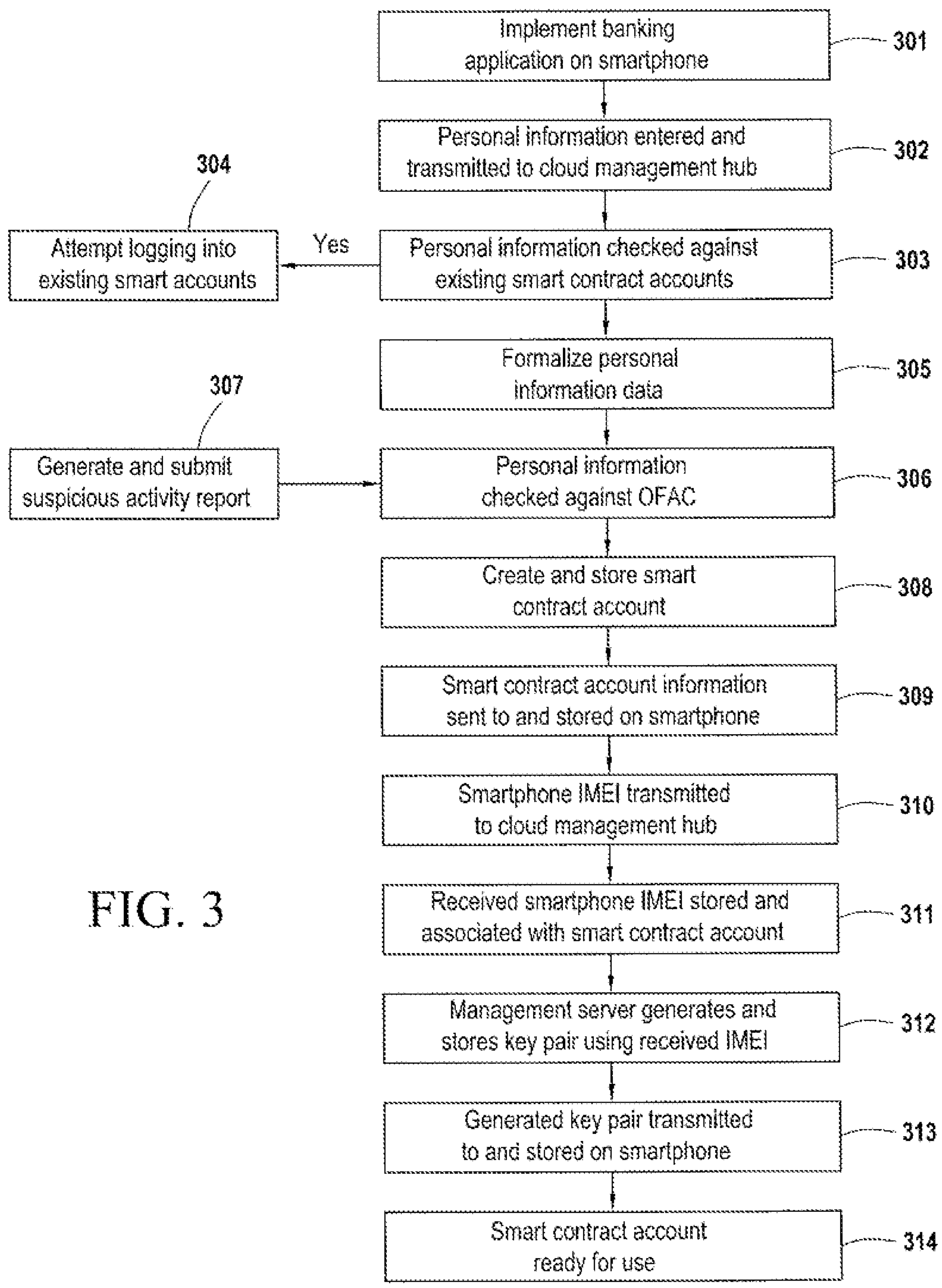
FIG. 3 is a flowchart describing the process of creating a smart contract account for a new customer as implemented in an exemplary embodiment.

In FIG. 3, a flowchart depicting the process of creating a smart contract account for a new customer as implemented in an exemplary embodiment of the localized smart contract banking system is depicted. As shown in FIG. 3, the smart contract account creation process 300 is initiated in step 301 with a new customer downloading and implementing a customer banking application 160 on a smartphone type device 113, 123. The smartphone type device 113, 123 may include any device known to one of ordinary skill in the art capable of wireless communication and of implementing software applications.

Once the customer banking application 160 has been installed and implemented on the customer's smartphone type device 113, 123, the customer banking application 160 in step 302 prompts the customer for personal identification information and other necessary information. This information may include the customer's name, age, mailing address, primary and alternative email addresses, a 4-digit security pin, an alphanumeric password, security questions, phone numbers, tax identification number and if the smartphone type device permits certain biometric information such as fingerprints or identifying pictures. The customer banking application 160 wirelessly and securely transmits the entered information to the cloud management hub 130 utilizing standard level security methods such as 128-Bit encryption that is established upon installation on the smartphone type device 113, 123.

The information may also be entered directly into an in-store server 111, 121 and transmitted to the cloud management hub 130 by this in-store server 111, 121.

Once the cloud management hub 130 receives the information transmitted from the customer's smartphone type device 113, 123, or receives the new customer information entered into an in-store banking server 111,121, the management server 131 in step 303 checks to see if the received information validates against existing smart contract accounts stored in the database 133 at the cloud management hub 130.

If it is determined that the received information does validate against an existing valid account, the management server 131 in step 304 transmits an acknowledgement back to the smartphone type device 113, 123 and the customer banking application 160 prompts the customer to log into that existing smart contract account. After three consecutive unsuccessful attempts to login a security warning advising the attempted intrusion is sent to the account holder's email and phone number(s) and logged within the cloud management hub as suspicious activity.

Alternatively, if it is determined that the received information does not correlate to an already existing valid account, the management server 131 in step 305 formalizes the received information and then in step 306 cross references the formalized information against the Special Designated Nationals List maintained by the Office of Foreign Asset Control.

The Office of Foreign Assets Control ("OFAC") of the US Department of the Treasury administers and enforces economic and trade sanctions based on US foreign policy and national security goals against targeted foreign countries and regimes, terrorists, international narcotics traffickers, those engaged in activities related to the proliferation of weapons of mass destruction, and other threats to the national security, foreign policy or economy of the United States. As part of its enforcement efforts, OFAC publishes the Special Designated Nationals List of individuals and companies owned or controlled by, or acting for or on behalf of, targeted countries. It also lists individuals, groups, and entities, such as terrorists and narcotics traffickers designated under programs that are not country-specific.

If it is determined that the received information does reference someone on the Special Designated Nationals List, the management server 131 generates and submits a suspect activity report to the proper authorities in step 307 and the process ends.

Alternatively, if it is determined that the received information does not reference anyone included on the Special Designated Nationals List, the management server 131 in step 308 creates and stores the customer's new smart contract account based on the formalized personal information data.

Once the new smart contract account has been created, the management server 131 in step 309 transmits the new account information to the customer's smartphone type device 113, 123. The new account may also be stored within a radio frequency identification tag ("RFID") that is then sent to the physical mailing address on file for the customer for activation and future use.

If a customer uses a smartphone type device to open a new account, the customer banking application 160 in step 310 retrieves and transmits the International Mobile Equipment Identity ("IMEI") number of the smartphone type device 113, 123, or any other unique electronic identifier associated with that smartphone type device 113, 123, to the cloud management hub 130.

Upon receiving the transmitted IMEI number or other associated unique electronic identifier, the management server 131 in step 311 stores the received IMEI number, or other associated unique electronic identifiers, in the database and associates the received IMEI number with the newly created smart contract account.

Once the IMEI, or other associated unique electronic identifier, has been saved and associated with the smart contract consumer account, the cryptographic key generation server 132 in step 312 generates a smartphone public and private key pair for that customer's smartphone type device 113, 123 based on the received IMEI or other unique electronic identifier(s) and stores the generated smartphone key pair with the smart contract account.

Once the smartphone key pair has been generated and saved to the smart contract account, the management server 131 in step 313 transmits the public key component of the smartphone key pair to the smartphone type device 113, 123 where it is locally stored by the smartphone banking application 160.

At this point the customer's smart contract account is ready for deposits and the smart contract account creation process 300 ends with step 314.

A digital smart contract account may also be created without the use of a smartphone type device 113, 123. In such an embodiment, the smart contract account may be created by the customer directly on an in-store banking server 111, 121 and, rather than using a smartphone type device 113, 123, a key fob type device may be used to implement transactions within the system. Rather than an IMEI number, the key fob, or digital frequency identification tag type device, is programmed with a newly generated and unique public and private key pair to enable digital transactions as well as with the 4-digit security pin entered into the in-store banking server 111, 121 during the creation of the smart contract account. The key fob is then sent to the owner of the customer via postal mail and he/she is required to activate it using his/her confidential identifying information on an in-store banking server 111,121. Once the customer has received and activated the key fob type device, the smart contract account will be enabled and ready to receive coin and paper fiat currency deposits.

Figure 4:
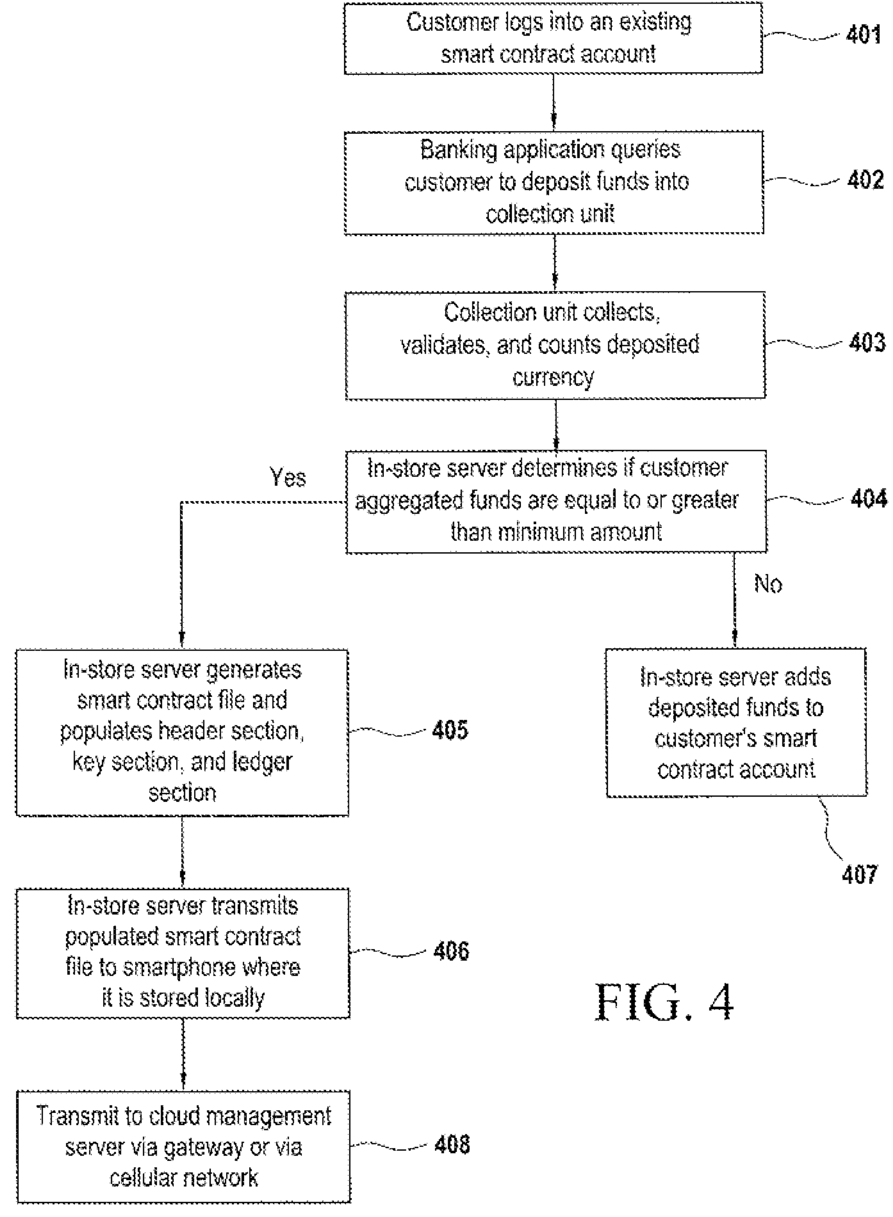
FIG. 4 is a flowchart describing the process of funding a smart contract account as implemented in an exemplary embodiment.

In FIG. 4, a flowchart describing the process of funding a smart contract account as implemented in an exemplary embodiment of the localized smart contract banking system is depicted. As shown in FIG. 4, the process of funding a smart contract account begins in step 401 with a customer logging into an existing smart contract account using either the local banking application 160 implemented on the smartphone type device 113, 123 or an in-store banking server 111, 121. The local banking application 160 securely transmits the login information over a cellular network 141 to the cloud management hub 130 for verification.

An in-store banking server 111, 121 within wireless range of the smartphone type device 113, 123 may monitor this activity over the closed and private wireless network 150 and may itself securely transmit the login information to the cloud management hub 130 via a network gateway device 124. The gateway device 124 may be located at either its present location or in another location with another in-store banking server 111, 121 that is within wireless range of the closed and private wireless network 150. As such, information may be transmitted and received from the cloud management hub 130 via a cellular wireless network 141 or a via wide area network connection such as the Internet 140. The smartphone device 113, 123 and in-store banking servers 111, 121 may communicate directly via the local private wireless network 150.

Once the login information is received, the management server 131 attempts to validate the received login information against an existing smart contract account. If login information cannot be validated, the management server 131 transmits back to the in-store banking server or the smartphone device 113, 123 that the customer's login attempt failed.

If the login information is validated, the management server 131 transmits an acknowledgement back to the in-store banking server 111, 121 and the smartphone type device 113, 123 and the in-store banking server 111, 121 prepares for a cash deposit.

Once the customer has successfully logged into an existing smart contract account, the in-store banking server 111, 121 in step 402 queries the customer to physically deposit coin or paper currency into the collection unit 203 of the in-store banking server 200.

Once the customer has deposited currency, the collection unit 203 in step 403 physically collects, validates and stores all the physically deposited currency within the in-store banking server 200 and determines the actual amount deposited. In an alternative implementation the value of the smart contract may be added to so that change, or coins, due back to the consumer after cash transactions may be linked or deposited in anticipation of and instead of coins or bills being dispensed.

Once the amount of currency has been counted, the in-store banking server 111, 121 in step 404 then determines if the total amount of currency currently assigned to that smart contract account is equal to or greater than a minimum amount.

If the total amount deposited is less than the minimum amount, the in-store banking server 111, 121 will store this information locally as well as relay the information to the cloud management hub 130 and the customer's smartphone type device 113, 123. The counted amount will be assigned to the customer's smart contract account and totaled with any other previous deposit amounts less than the minimum amount. While the totaled amount assigned to the smart contract account is less than the minimum amount, these funds may not be available for transactions with the smart contract banking system.

A minimum amount is necessary to account for a processing fee within the smart contract banking system. This minimum amount is necessary to allow for the cost of physically processing currency as well as digitally storing, converting and transacting smart contract consumer accounts within the United States Banking system or other corporate entities.

Alternatively, if the total amount deposited or the totaled amount assigned to the smart contract account is now equal to or greater than the minimum amount, then the in-store banking server 111, 121 in step 405 creates the smart contract file(s) for that customer's smart contract account.

In creating this smart contract file, the in-store server 111, 121 populates each of the header, key, and ledger sections as appropriate.

The header section of the smart contract is populated with at least a time-stamp identifying the local time when the file is created and a geo-stamp identifying the location of the in-store server 111, 121 creating this file. The in-store server 111, 121 using data from its GPS unit to create the geo-stamp.

The key pair section of the smart contract is populated with all appropriate key pairs. If the customer is using a smartphone type device 113, 123, the in-store server requests that the banking application 160 transmit the stored public smartphone key and that the cloud management hub 130 transmit the private smartphone key associated with that customer's smart contract account. If the smartphone key pair is validated, this smartphone key pair is populated into the key pair section of the smart contract file.

The in-store server 111, 121 generates a GPS key pair using values provided by the GPS unit 203 thereby populating the GPS key pair into the GPS key pair section of the smart contract file.

If a monetary value may be added or subtracted to or from this smart contract after its creation, the in-store server 111, 121 generates a value add and/or subtract key pair for the smart contract and also populates this key pair addition event in an abbreviated manner into the header section of the smart contract file for quick reference. The file header may contain information relating to the geo-stamp, the number of times or in what ways a smart contract has been updated or changed. In this implementation the key pair addition or subtraction event could be abbreviated and used for quick reference within the header section of the smart contract. Without this value add/or and subtract key pair, monetary value may not be added or subtracted to the smart contract after its creation.

If the in-store server is located within a retail establishment that is a defined third party or is a member of a defined third party chain, a third party key pair for that specific third party may be generated and also populated into the key section of the smart contracts. The third party key pair may be used to limit access on an ongoing basis and in real-time to personal information while still allowing transactions to occur for specific or select establishments.

A public master key is generated by the in-store server 111, 121 and then populated within the key section of the smart contract. This public master key is needed to gain access to the smart contract banking system prior to performing any transactions.

If a point-of-sale terminal 112,122 is allowed to perform a transaction on the smart contract, then a point-of-sale public and private key pair are populated into the key section.

Any other public and private key pairs may be included with the key section as needed and as appropriate.

The ledger section is populated with a block chain and corresponding hashes representing each transaction performed using this specific smart contract belonging to this customer. In this particular situation, a transaction that adds a monetary value to the smart contract is generated and added to an initial block and that initial block is added to the ledger section. The in-store server also generates a corresponding hash value based on that initial block and stores that hash with the block in the ledger section.

Once the smart contract file has been created and populated, the in-store server 111, 121 in step 406 transmits the smart contract to the customer's smartphone type device 113, 123 where it is locally stored and managed by the banking application 160. The in-store server 111, 121 transits the smart contract to the smartphone type device 113, 123 using the local private network 150.

Lastly, at some point in step 408, the in-store server 111, 121 may also transmit the customer's smart contract to the cloud management hub 130 via an accessible network gateway 124. Alternatively, at some point, the customer's smartphone type device 113, 123 may transmit the locally stored smart contract to the cloud management hub 130 via the cellular network 141. The blockchain in the ledger section of the smart contract stored on a customer's smartphone device 111, 121 reflects all transaction associated with that specific customer. The in-store servers 111, 121 will similarly store and manage a smart contract file whose ledger section contains a blockchain that reflects all transactions performed within a defined geographic area. The cloud management hub 130 will also similarly store and manage a smart contract file whose ledger section contains a block chain that reflects all transaction. As time passes, each of these smart contract files are synchronized and updated across all in-store server 111, 121 and the cloud management hub 130 via the local private network 150, the cellular network 141, and the Internet 140.

A smart contract stored on a customer's smartphone type device 113, 123 may be labeled either public or private. Smart contracts labeled private are meant for personal use as either digital currency to facilitate a transfer of value for the purchase of goods or as a digital smart contract associated with services such as traditional electronic purchases, thematic investment products such as Exchange Traded Funds (ETF). Smart contracts labeled public are meant to be lent directly, indirectly, or in a group manner from one smartphone type device 113, 123 to another smartphone type device 113, 123 or donated to public charities through the network of in-store banking hubs 110, 120.

Figure 5:
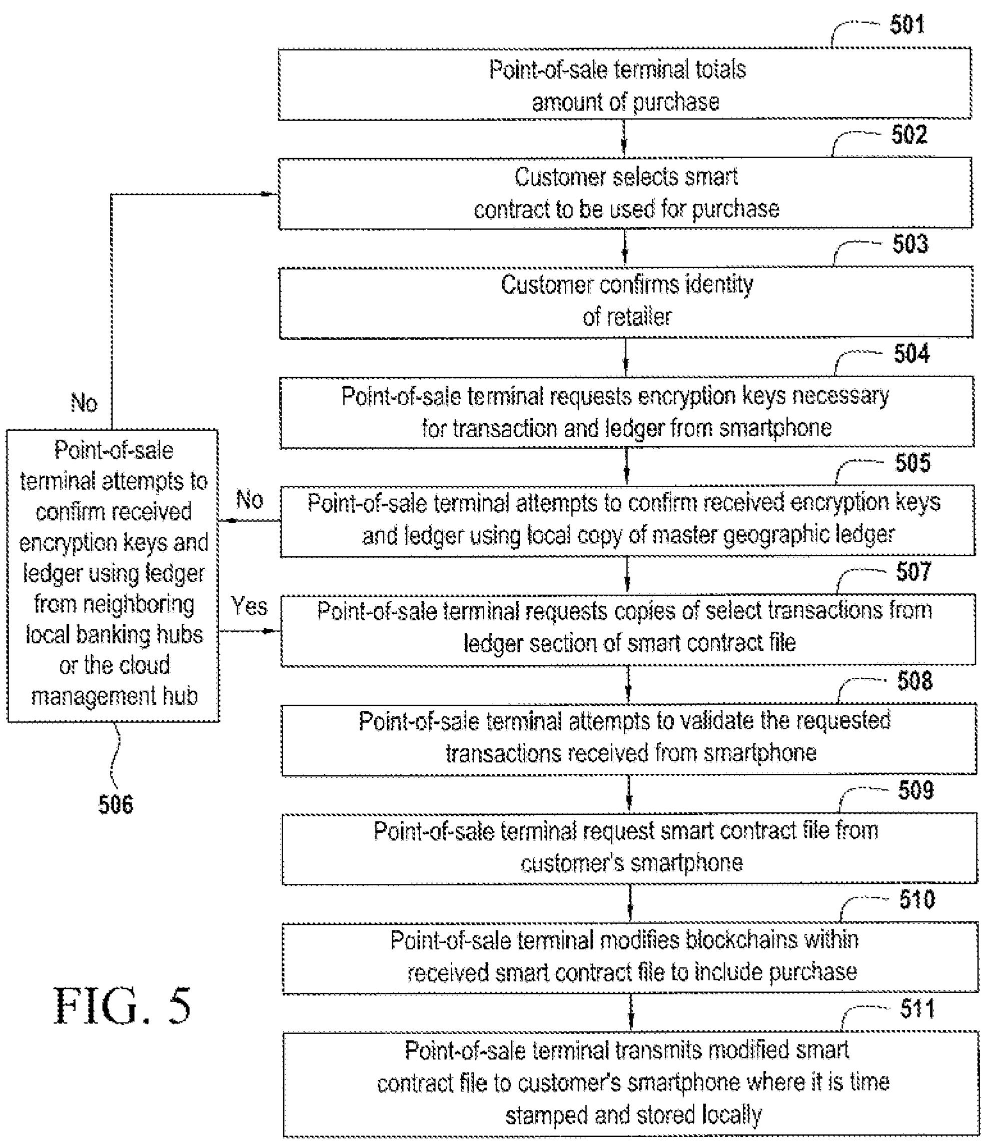
FIG. 5 is a flowchart depicting the process of a smart contract transaction as implemented in an exemplary embodiment.

In FIG. 5, a flowchart depicting the process of a smart contract consumer account transaction as implemented in an exemplary embodiment of the localized smart contract banking system is depicted. As shown in FIG. 5, the smart contract transaction process 500 begins in step 501 with a point-of-sale terminal 112, 122 at a specific retailer location totaling the cost of the goods and services to be purchased by a customer and then initiating a smart contract transaction for that totaled amount.

Once the amount has been totaled, the customer in step 502 accesses the customer application 160 implemented on his/her smartphone type device 113, 123 and selects a smart contract to be used to cover the totaled cost of the goods and services purchased. If the customer chooses not to use a smartphone type device but instead uses a key fob type device pre-programmed at a central facility, he/she can input specific user information such as account number, password, security pin and the number and type of smart contract to be used on the screen of the point of sale terminal 112, 122.

Once the smart contract has been selected, the customer application 160 in step 503 prompts the customer to confirm the identity of the retailer. The customer application 160 may communicate wirelessly with all point-of-sale terminals 112, 122 within wireless range of the smartphone type device 113, 123 over the closed and private wireless network 150. Each point-of-sale terminal 112, 122 broadcasts information identifying the retailer associated with that specific point of sale terminal 112, 122. The customer application 160 prompts the customer to confirm the retailer, thereby ensuring that the customer application 160 is performing the transaction with the proper retailer when there are multiple retailers within wireless range of the smartphone type device 113, 123.

Once the customer has confirmed the retailer, the point-of-sale terminal 112, 122 in step 504 requests the necessary encryption keys from the smartphone type device 113, 123. The master public key is stored in the key section of the selected smart contract and is required to attempt a transaction.

Once the point-of-sale terminal 112, 122 has received the master public key from the smartphone type device 113, 123, the point-of-sale terminal in step 505 attempts to continue the transaction by using the keys and ledger on record in order to validate the smart contracts presented by the customer. To do so it requests the public key from the smartphone type device 113, 123 to begin formatting a smart contract transaction to be processed.

If the point-of-sale terminal 112, 122 is not able to validate the received associated keys, the point-of-sale terminal 112, 122 will not attempt to complete the transaction and the transaction will end.

Alternatively, if the point-of-sale terminal 112, 122 is able to validate the received master public key, the point-of-sale terminal 112, 122 in step 506 further requests any public and private key pairs necessary to perform the specific transaction to be performed on the selected smart contract. In order to process a transaction which subtracts or adds value to or from the selected smart contract(s) using the point-of-sale terminal 112, 122 for the purchase of goods or services, the public and private key pairs included in the key section of the selected smart contract must at least include the point-of-sale terminal key pair, the value add and subtract key pair and the keys associated with the participating devices. Of course, geo-specific key pairs may be validated by the point-of-sale terminal 112, 122 as the transaction or location requires.

If the point-of-sale terminal 112, 122 is not able to validate all relevant key pairs, the process 500 jumps to step 502 where it asks for which smart contracts to select for payment or ends.

Alternatively, if the point-of-sale terminal 112, 122 is able to validate all relevant key pairs, the point-of-sale terminal 112, 122 in step 507 requests copies of a defined number of transactions from various times and positions from within the blockchains stored within the ledger section of the selected smart contracts on the smartphone type device. The requested transactions are not necessarily selected from sequential portions of the stored blockchains on record. The banking application 160 copies the requested transactions from the ledger section of the selected smart contract and transmits them to the point-of-sale terminal 112, 122 wirelessly.

Once the requested blockchain sections have been received, the point-of-sale terminal 112, 122 in step 508 compares the received transaction records using data summarized in the header section of the smart contracts with its corresponding ledger records, based on the nodes transacted with or the geo-position from where the transaction records indicate the transactions occurred. The ledger or blockchain sections of the smart contracts stored by the local banking hub, reflect all smart contract transactions that have occurred within the specified or defined geographic region where the point-of-sale terminal 112, 122 is located. If the latest version of this smart contract is not currently stored on the point-of-sale terminal 112, 122, the point-of-sale terminal 112, 122 requests the latest copy of this smart contract from the in-store server 111, 121, if the in-store banking server 111,121 does not have a record of the received ledger records it can attempt to validate the ledger presented by the customer's smartphone type device 113,123 by communicating directly and wirelessly with nearby point-of-sale terminals 112,122 or other nearby in-store banking servers 111,121 located within wireless range. If this fails to validate the selected ledger entries presented by the consumer, the in-store banking server 111,121 can command the point-of-sale terminal 112,122 to use the data connection of the customer's smartphone type device 113,123 to call the cloud management hub 130 directly to confirm the ledger entries within the smart contracts presented to the point-of-sale terminal 112,122.

The comparison performed at the point-of-sale terminal 112, 122 validates that the transactions in the blockchains from the in-store server or from the management server are located at the same times and positions as the copies of the requested transactions received from the selected smart contract stored on the customer's smartphone type device 113, 123.

If the received transactions are not validated, the process 500 jumps to step 502 where the transaction attempt ends and the customer is prompted to select other smart contracts.

Alternatively, if the received transactions are validated, the point-of-sale terminal 112, 122 request that the selected smart contract be transmitted from the customer's smartphone type device 113, 123 to the point-of-sale terminal 112, 122 and to the cloud management hub 130 as a record of transaction. This process can be done after the transaction has occurred and independently using the data connection of the smartphone type device 113,123.

Once the selected smart contract has been received, the point-of-sale terminal 112, 122 in step 510 modifies the blockchains within the ledger section to include that customer's current purchase.

If the customer decides to pay in cash rather than using the selected smart contract, any change due the customer may be added to the selected smart contract. Specifically, the blockchains within the ledger section may be amended to add the value of the change due the customer.

Once the selected smart contract has been modified, the point-of-sale terminal 112, 122 in step 511 transmits the modified smart contract to the customer's smartphone type device 113, 123 where it is stored with the latest time stamp.

Once the selected smart contract has been modified at the point of sale 112,122 and in-store banking server 111,121, the point-of-sale terminal 112,122 updates nearby private networks 150 wirelessly in order to update the master ledger at the cloud management hub 130. The cloud management hub eventually receiving update smart contracts from the customers' smartphone type devices 113,123 which then serve to prepare smart contracts on the master ledger that have yet to be fully reconciled by merchants for reconciliation in batches. Only if and when the merchant chooses to update the cloud management hub 130 with a batch of smart contracts transacted by their point-of-sale terminal(s) 112, 122 can they get begin an Automated clearing house payment process to their bank account.

Figure 6:
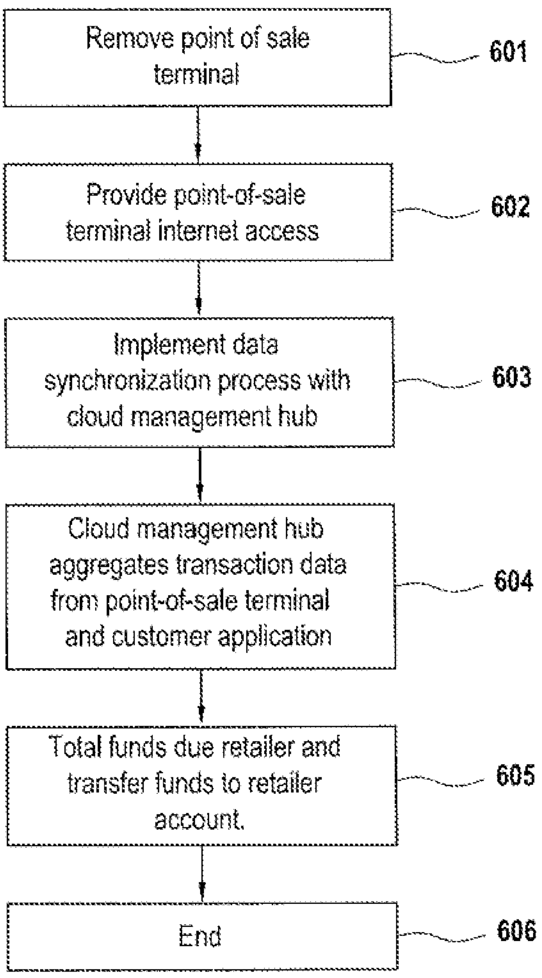
FIG. 6 is a flowchart depicting the process of a merchant automated clearinghouse payment process as implemented in an exemplary embodiment.

In FIG. 6, a flowchart of the process of a merchant automated clearinghouse payment process as implemented in an exemplary embodiment of the localized smart contract banking system is depicted. As shown in FIG. 6, the merchant automated clearing house payment process 600 begins in step 601 with a merchant initiating a shutdown of the point of sale terminal 112, 122 at the retailer location. This may be done using the touchscreen display on the point of sale terminal 112, 122. Once it has been shut down and powered off, the point of sale terminal 112, 122 may be safely removed from the retailer location.

Once the point of sale terminal has been safely removed, the merchant in step 602 moves it to a location with direct Internet access. At this location, the point of sale terminal 112, 122 is powered up and given direct access to the Internet.

Once the point of sale terminal 112, 122 has access to the Internet, the merchant in step 603 initiates a data synchronization process between that point of sale terminal 112, 122 and the cloud management hub 130, this process transfers all of the executed transactional data currently stored on that point of sale terminal 112, 122 to the cloud management hub 130 including records of the cryptographic tokens or smart contracts used in the transfer of value from customer to merchant.

Once the point of sale terminal 112, 122 has finished synchronizing with the cloud management hub 130, the cloud management hub 130 in step 604 correlates the aggregated transactional and cryptographic token data received from the point of sale terminal 112, 122 with locally stored records relayed from smartphone type devices 113, 123 in order to complete the transfer of value to the merchant.

Once the cloud management hub 130 has successfully correlated data received from the point of sale terminal 112, 122, it totals in step 605 the amount owed to the retailer less the total amount of coins exchanged for smart contracts, and issues an electronic payment for that amount to the merchant's bank account.

Lastly, having successfully transferred the owed funds to the retailer, the clearinghouse payment process in step 606 finalizes the transfer of value from aggregated purchases since the previous automated clearinghouse transaction event and the process ends.

In an embodiment of the present invention, low-value cryptographic cashless transactions are provided in exchange for digital marketing events. Targeted and interactive multimedia advertisements, coupons, rewards points and purchase vouchers are delivered to smartphone type devices 113, 123 from an in-store banking server 111, 121 implementing a cryptographic cashless transaction.

Once a digital currency account has been created, an anonymizing data bridge is used to send the IMEI number, or other unique electronic identify, associated with that digital currency account to the key generator engine server 132. The key generator engine server 132 stores both the IMEI number, or other unique identifier, and the digital currency account number in a local key table controlled by the cloud management hub 130.

An advertising subsidiary uses the key table to identify customer engagements with previous multimedia events. Specifically, whenever a smartphone type device 113, 123 transmits details of an executed transaction to the cloud management hub 130 via the cellular network 141 of the smartphone type device 113, 123, a multimedia-advertising event is delivered in return, from the cloud management hub 130 to the smartphone type device 113,123 by either the in-store banking server 111,121 or via the cellular communication network already established and provided by the smartphone type device 113, 123 and its user. At this time, the key table is used to identify which digital currency account is currently being used and therefore how to more appropriately deliver discrete, unique and interactive multimedia advertising events. Once the digital currency account has been identified, the customer's interactive history with previous multimedia advertising events may be accessed and a demographic understanding of this history may be used to provide unique, discrete and interactive multimedia advertising events to that customer.

A customer may choose to interact with an advertisement, coupon or voucher in any way they choose including pausing, tagging or labeling a product they may like to purchase or inquire about, swiping right or left to imply they are or are not interested, or by clicking, shaking, holding or tapping any number of various buttons on the smartphone type device to imply that the advertisement is wholly or partially irrelevant to them. These interactions are saved and compartmentalized for each smart contract account and may be used in the future for increasingly more targeted and unique multimedia-advertising events. This process is cyclical in nature and allows the users of the in-store banking servers 111,121 and the embedded applications therein to curate their own advertisements by continued participation which more appropriately modifies the interactive-multimedia events thereafter for each individual user.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Figure 7:
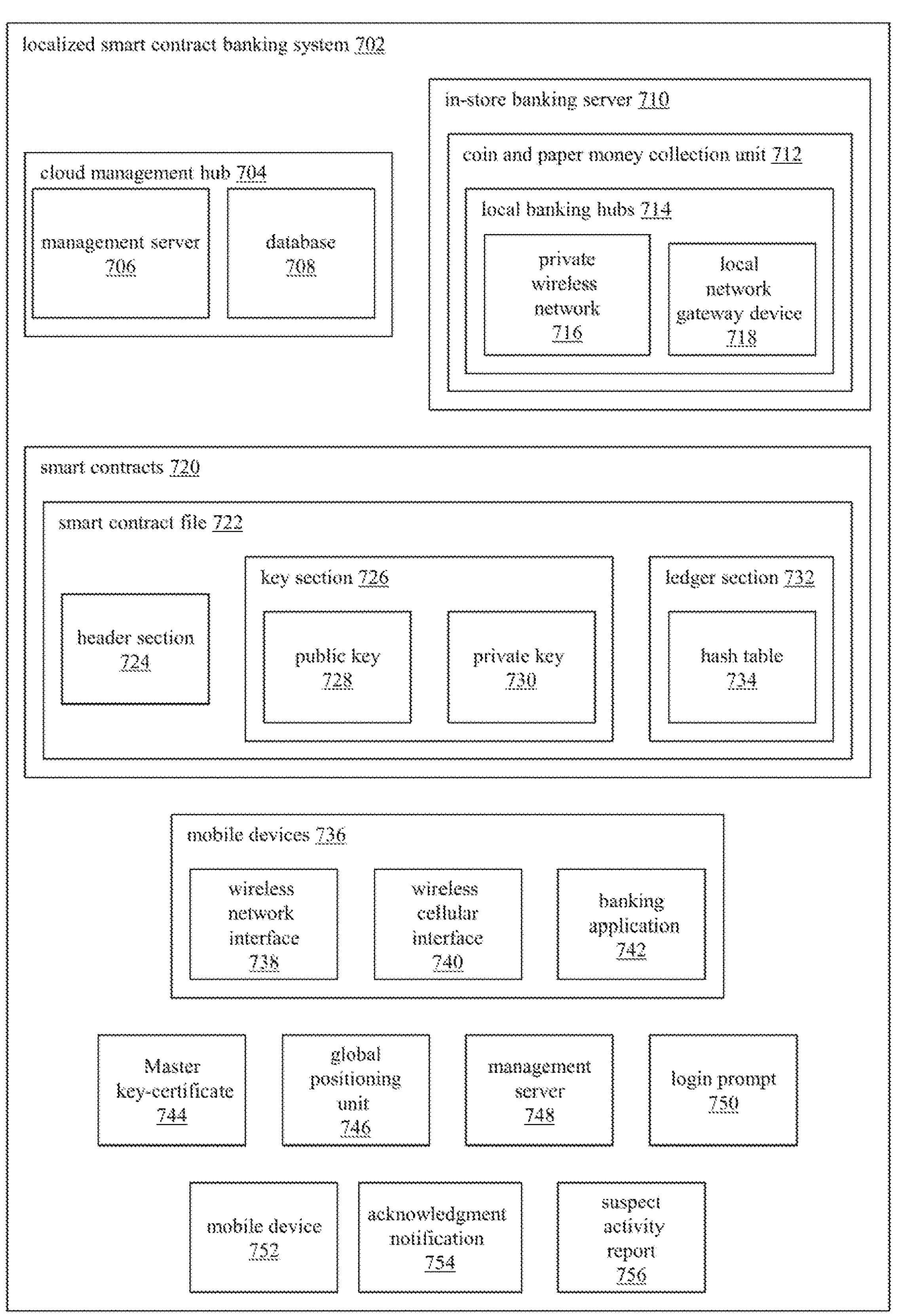
FIG. 7 is a block diagram illustrating a localized smart contract banking system, according to some embodiments of the present disclosure.

FIG. 7 is a block diagram that describes a localized smart contract banking system 702, according to some embodiments of the present disclosure. In some embodiments, the localized smart contract banking system 702 may include a cloud management hub 704 to administer a smart contract redemption process, an in-store banking server 710, a global positioning unit 746 to generate a location based geo-stamp that may be securely integrated into the header section 724 of the smart contract file 722. A mobile device 752 is in communication with the system over the network. A management server 748 is configured to compare the identification information against smart contract accounts stored in the database 708. An acknowledgment notification 754 and/or a login prompt 750 may be transmitted to the mobile device 752 if the identification information is be validated against an existing account of the smart contract accounts. A suspect activity report 756 may be generated and transmitted to an authority if the identification information is not validated against the smart contract accounts.

In some embodiments, the localized smart contract banking system 702 may also include one or more smart contracts 720. The one or more smart contracts 720 may be generated by each of the plurality of local banking hubs 714. The localized smart contract banking system 702 may also include one or more mobile devices 736 that may be in communication with one or more individual disparate local banking hubs of the plurality of local banking hubs 714. Each of the plurality of local banking hubs 714 and the point-of-sale terminal communicate directly with the mobile device via the private wireless network 716. The point-of-sale terminal is configured to validate a type of the one or more mobile devices 736 using the public key 728 and the private key pair 730 retrieved from the key section 726 of the smart contract file 722. The localized smart contract banking system 702 may also include a master key-certificate 744. The master key-certificate 744, via the in-store banking server 710, is configured to embed and pre-position the cryptographically unique tokens within the smart contract file 722 stored locally on the one or more mobile devices 736.

The cloud management hub 704 may include a management server 706 and a database 708. The in-store banking server 710 may also include a coin and paper money collection unit 712 to collect and store coins and paper currency. The coin and paper money collection unit 712 is configured to convert the coins and the paper currency into cryptographically unique tokens. The coin and paper money collection unit 712 may include a plurality of local banking hubs 714 located at a plurality of individual merchant facilities.

The plurality of local banking hubs 714 may include a private wireless network 716 implemented by the in-store banking server 710 for providing communication between the plurality of local banking hubs 714 located at neighboring merchant facilities within a range of the private wireless network 716 and a local network gateway device 718 installed within the plurality of local banking hubs 714. The local network gateway device 718 may allow the cloud management hub 704 to communicate with a subset of the plurality of local banking hubs 714 over a wide area network.

The one or more smart contracts 720 may include a smart contract file 722. The smart contract file 722 may include a header section 724, a key section 726, and a ledger section 732. The key section 726 may include a public key 728 and a private key 730 pair. The ledger section 732 may also include a hash table 734 populated by ledger entries defining previous individual transactions of the smart contract file 722. The one or more smart contracts 720 are configured to securely extract value in a multi-phase value chain, where, in an offline mode, interactions, settlement activities and value extraction may be done as rewards points and an affinity-based value exchange for a private network and where, in an online mode, synchronous events occur, updates to the ledger section 732 of the smart contract file 722 may be made, and value may be moved to be made fungible in an open-loop manner.

In some embodiments, the one or more mobile devices 736 may include a wireless network interface 738 allowing the mobile device 752 to communicate with the one or more individual disparate local banking hubs of the plurality of local banking hubs 714 through the cloud management hub 704 and a wireless cellular interface 740 allowing the mobile device 752 to communicate with the cloud management hub 704 asynchronously or in both online and offline modes. These different modes of communication involve a mobile device and multiple hubs within a system.

Asynchronous communication refers to a type of data exchange where the sender and receiver are not required to interact in real-time or synchronize their activities. In this context, the wireless cellular interface enables the mobile device to communicate with the cloud management hub asynchronously. This means that the mobile device can send and receive data to or from the cloud management hub without the constraint of immediate, real-time interaction. Asynchronous communication allows the device and the cloud management hub to operate independently of each other's timing. The device can initiate communication with the hub without waiting for an immediate response, and the hub can process the received data at its own pace without needing instant interaction with the device.

An online mode refers to a state where the mobile device is actively connected to the network (in this case, the cloud management hub) and can transmit and receive data in real-time. In this state, the device is actively interacting with the cloud management hub, facilitating immediate communication and data exchange. On the other hand, offline mode signifies a state where the mobile device is not actively connected to the network or the cloud management hub. In this mode, the device might store data locally and perform certain operations independently without an active connection to the central hub. It can collect, store, or process data locally until it reconnects to the network, enabling synchronization or data transmission when connectivity is restored. In summary, asynchronous communication allows for non-real-time data exchange between the mobile device and the cloud management hub, while online mode represents active real-time communication, and offline mode indicates the device's ability to function independently without an immediate connection to the network or hub.

The one or more mobile devices 736 may also include a banking application 742 to manage bidirectional (to and from) identification information of a customer. The banking application 742 is configured to receive the individual transactions of the smart contract file 722 from the point-of-sale terminal. The banking application 742 is configured to process the individual transactions. The banking application 742 is configured to transmit and receive the identification information to the cloud management hub 704 utilizing encryption methods.

The mobile device 752 locally copies, stores, and relays the smart contract file 722 associated with a specific banking hub of the plurality of local banking hubs 714 and a specific transaction event and is used as a programmatic method to purchase the goods and the services or extract the value from the plurality of individual merchant facilities in a closed loop manner. The location based geo-stamp may allow the smart contract file 722 to restrict or grant approval as to where a transaction of the individual transactions based on geo-parameters may be permitted to occur, what devices the smart contract file 722 may be permitted to interact with, and to whom and from whom value may be transferred relative to location and time. The reference to a "closed-loop manner" within the described system pertains to a self-contained and internally operating payment mechanism facilitated by the mobile device's capabilities. When the mobile device copies, stores, and relays the smart contract file associated with a particular banking hub and transaction event, it essentially initiates a self-sustained transactional process. This process is "closed-loop" in nature, indicating that the entire sequence of actions—from file replication and storage to transaction execution—occurs within the confines of the system itself without extensive reliance on external networks or third-party systems.

This closed-loop payment system operates autonomously, leveraging the stored smart contract file to execute transactions, such as purchasing goods or extracting value from multiple individual merchant facilities. By doing so, the mobile device acts as an independent transactional platform, ensuring that the transactional flow remains contained within the internal framework of the system without the need for constant external validation or interaction. The term "closed-loop manner" in this context signifies a self-reliant and self-operating payment system facilitated by the mobile device's ability to locally store and execute transactions using the smart contract file, thereby reducing external dependencies for transactional operations.

Figure 8:
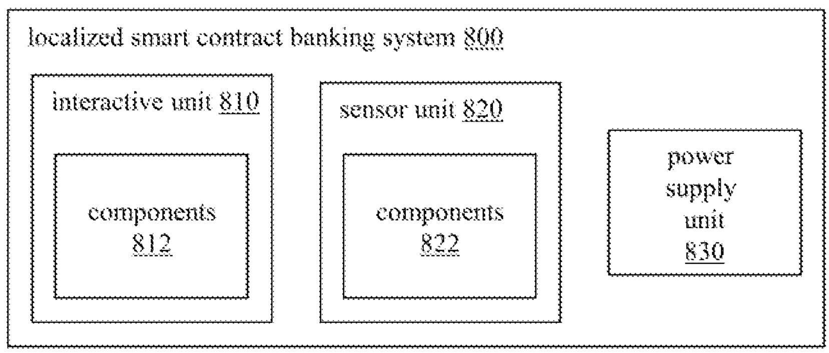
FIG. 8 is a block diagram illustrating the localized smart contract banking system, according to some embodiments of the present disclosure.

FIG. 8 is a block diagram that describes the localized smart contract banking system 800, according to some embodiments of the present disclosure. In some embodiments, the localized smart contract banking system 800 may include an interactive unit 810, a sensor unit 820, and a power supply unit 830. The in-store banking server. The interactive unit 810 may include components 812 necessary to communication with the mobile device and to process the transactions involved in the purchase of the goods and the services at the plurality of individual merchant facilities using the smart contract as the programmatic method. At least a central processing unit, a memory, and a secure local storage. The sensor unit 820 may include components 822 necessary to enable wireless communication over a closed and private wireless network between the in-store banking server and the mobile device within the range of the private wireless network.

Figure 9:
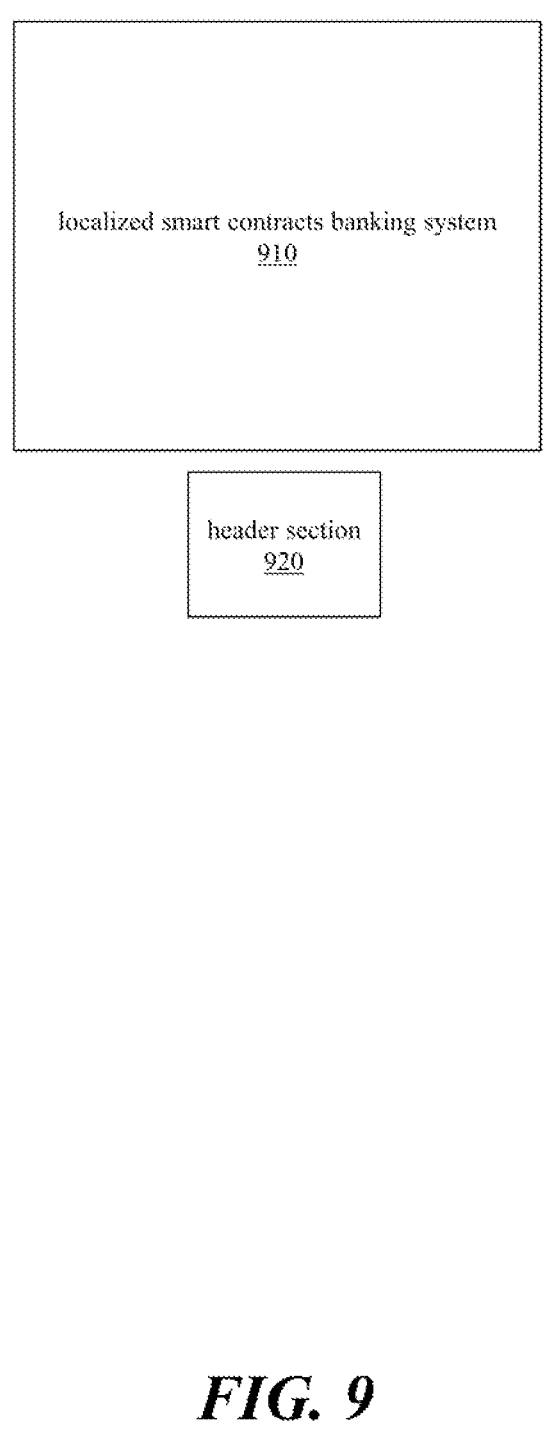

FIG. 9 is a block diagram that describes the localized smart contracts banking system 910, according to some embodiments of the present disclosure. In some embodiments, at least a time-stamp identifies a local time when the smart contract file was last accessed.

Figure 10:
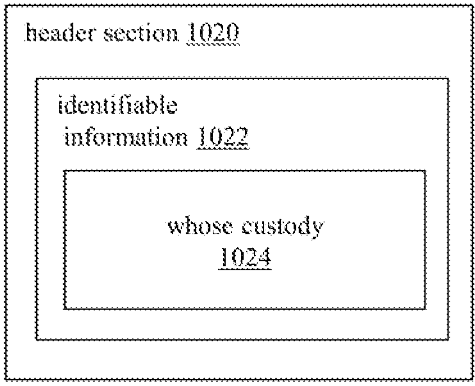
FIG. 10 is a block diagram further illustrating the localized smart contracts banking system from FIG. 9, according to some embodiments of the present disclosure.

FIG. 10 is a block diagram that further describes the localized smart contracts banking system 910 from FIG. 9, according to some embodiments of the present disclosure. In some embodiments, the header section 920 may also include any other uniquely identifiable information 1022 relevant to that smart contract's provenance, or history. The uniquely identifiable information 1022 may include whose custody 1024 the smart contract may now be in or may have been at one time.

Figure 11:
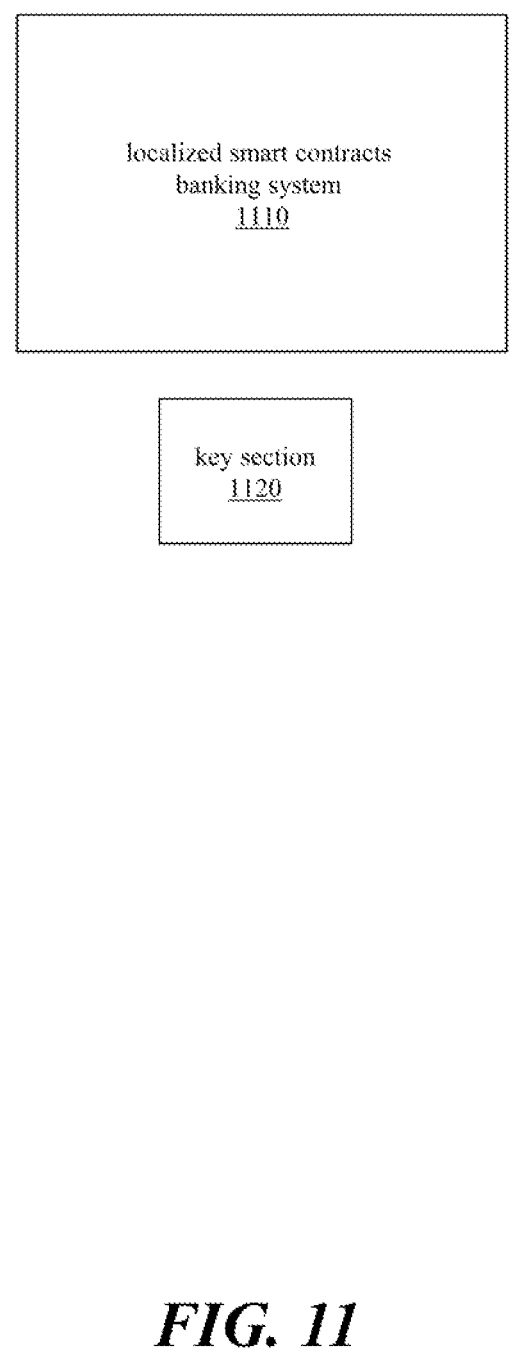

FIG. 11 is a block diagram that describes the localized smart contracts banking system 1110, according to some embodiments of the present disclosure. In some embodiments, at least a phone key pair enables and identifies processing of the smart contract on the mobile device and a master public key component enables validation of the smart contract on the mobile device.

Figure 12:
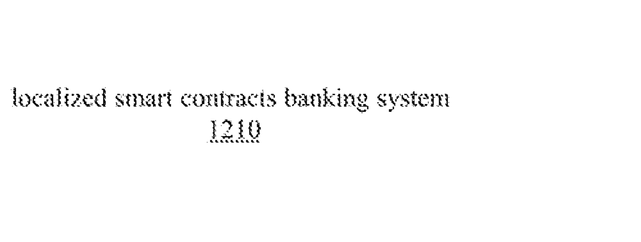
FIG. 12 is a block diagram further illustrating the localized smart contracts banking system from FIG. 11, according to some embodiments of the present disclosure.
Figure 12:
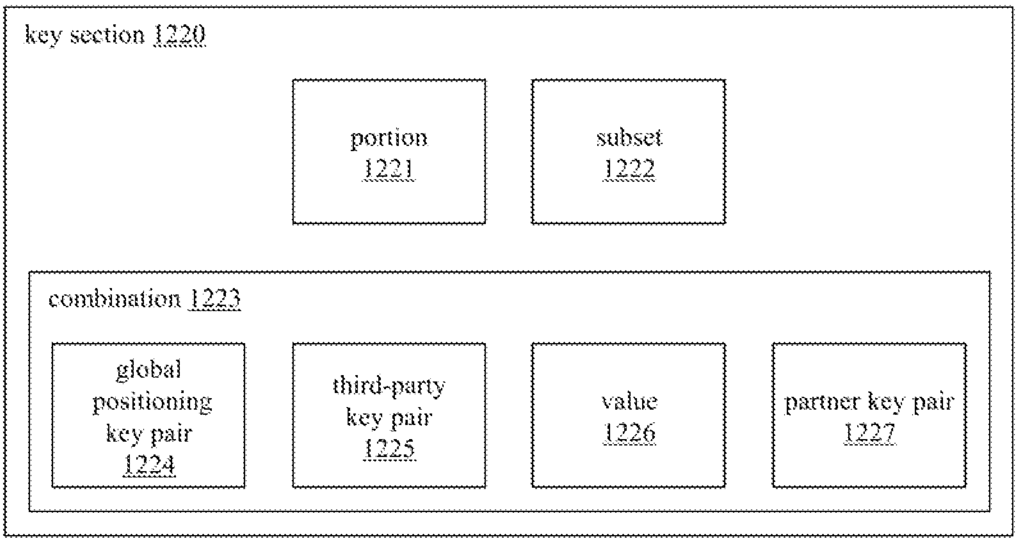

FIG. 12 is a block diagram that further describes the localized smart contracts banking system 1110 from FIG. 11, according to some embodiments of the present disclosure. In some embodiments, the key section 1120 may include any portion 1221, subset 1222, and combination 1223 of the phone key pair selected from the group. The combination 1223 may include a global positioning key pair 1224 that enables and identifies the processing of the specific smart contract conditioned on location information, a third-party key pair 1225 that enables and identifies the processing of the specific smart contract by an individual merchant facility of the plurality of individual merchant facilities, a value 1226 add and subtract key pair that enables processing of the specific smart contract to add and subtract a monetary retail value assigned to the specific smart contract, and a partner key pair 1227 that enables validation and identification of the individual merchant facility of the plurality of individual merchant facilities identified as specific retail partner. A point-of-sale terminal key pair that enables and identifies processing of a specific smart contract on a point-of-sale terminal.

Figure 13:
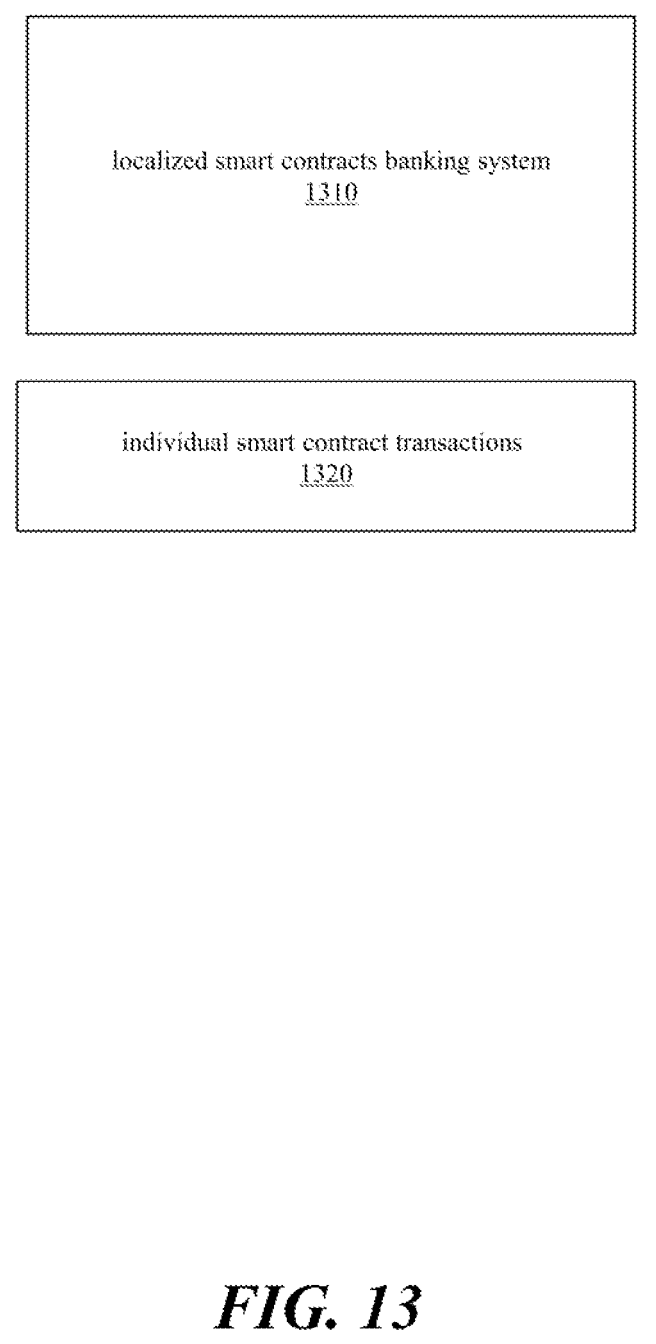

FIG. 13 is a block diagram that describes the localized smart contracts banking system 1310, according to some embodiments of the present disclosure. In some embodiments, the individual smart contract transactions comprise those performed using a specific smart contract file on the mobile device.

Figure 14:
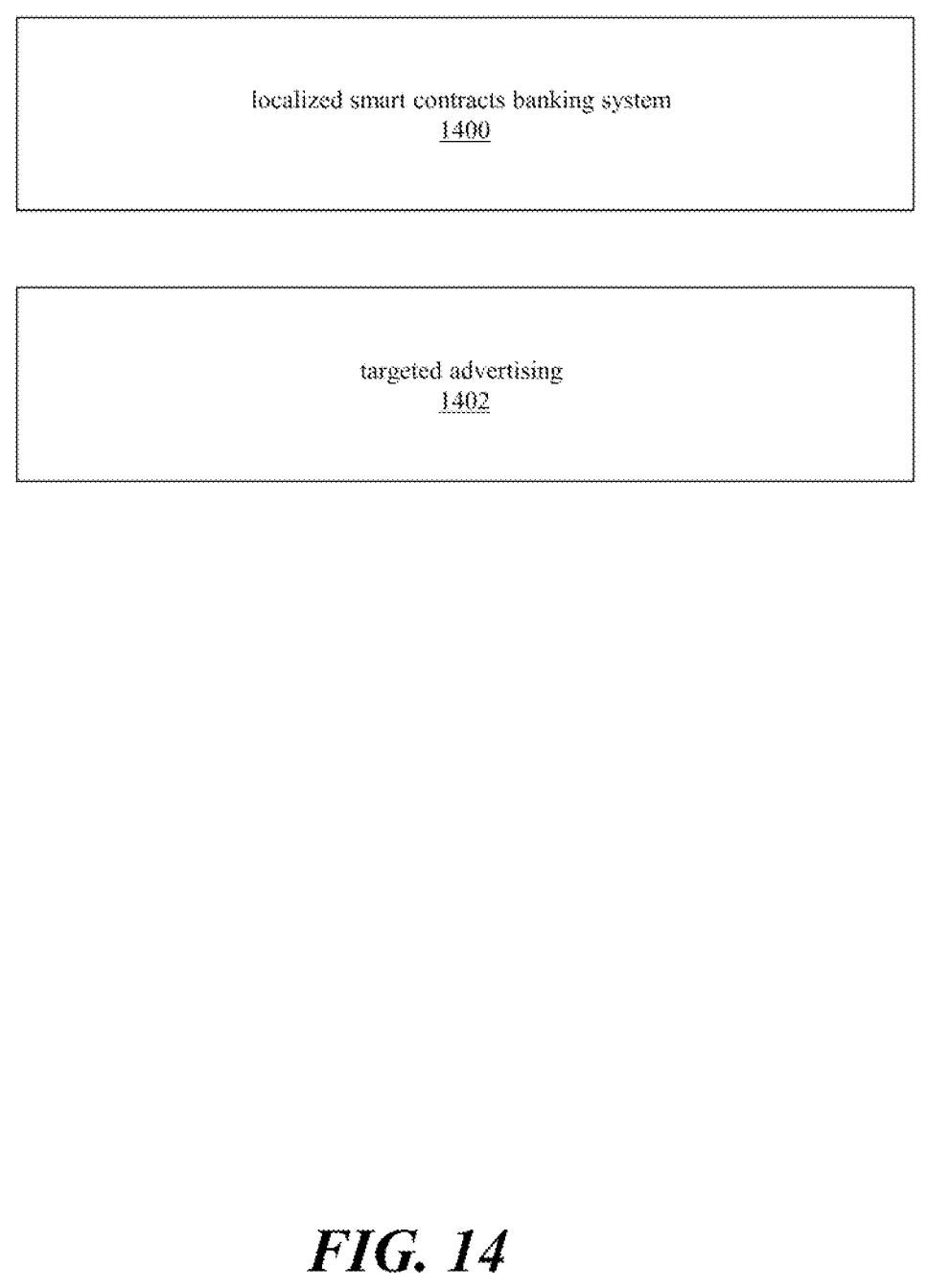

FIG. 14 is a block diagram that describes the localized smart contracts banking system 1400, according to some embodiments of the present disclosure. In some embodiments, the cloud management hub may deliver targeted advertising 1402 to the mobile device.

Figure 15:
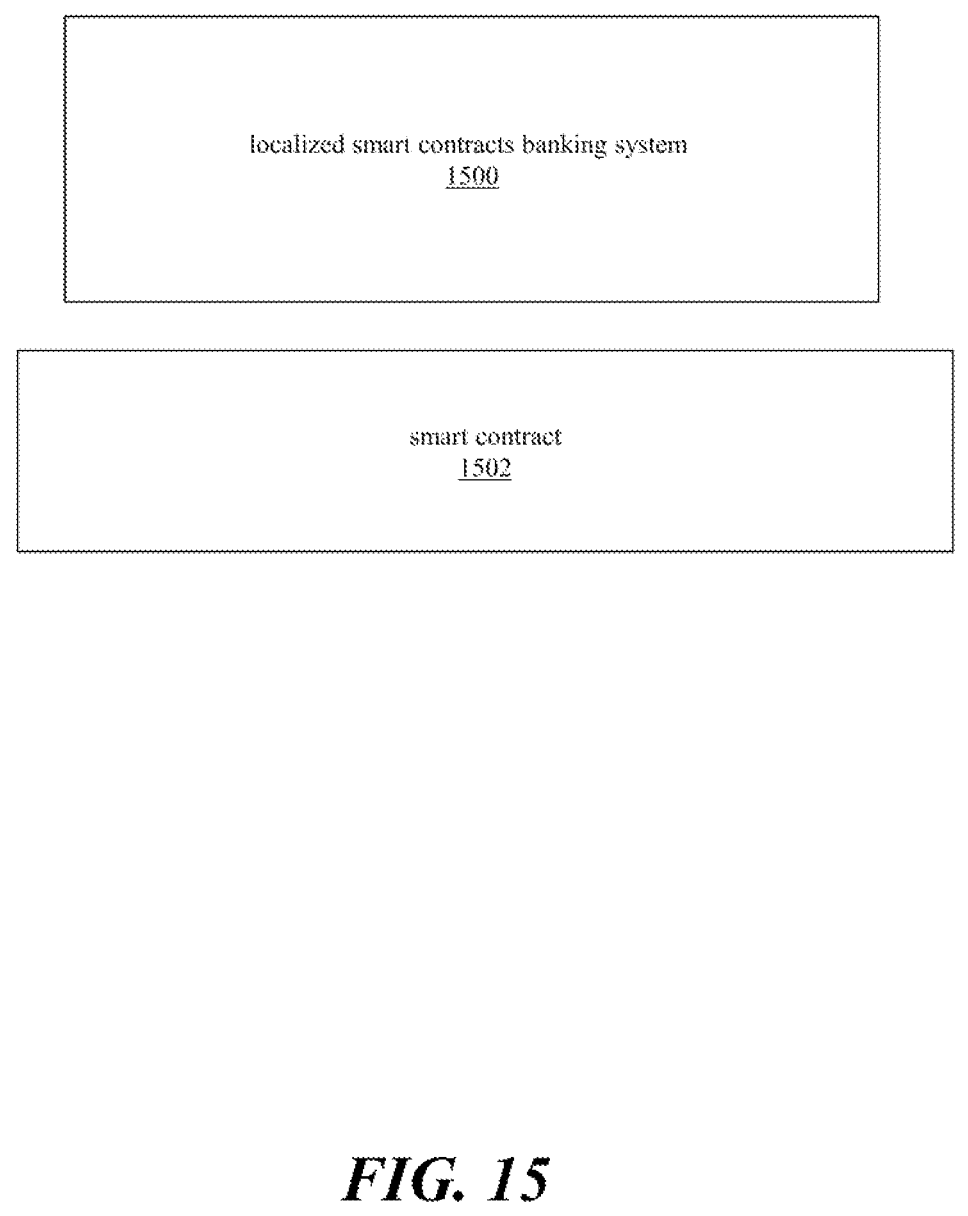

FIG. 15 is a block diagram that describes the localized smart contracts banking system 1500, according to some embodiments of the present disclosure. In some embodiments, each of the plurality of local banking hubs and the cloud management hub may store the smart contract 1502. The ledger section of the smart contract 1502 comprises all transactions with a defined geographic area. In some embodiments, a point-of-sale terminal may implement the programmatic method using the smart contract from the mobile device and a locally stored copy of the smart contract previously provided by a local banking hub of the plurality of local banking hubs or a copy of the smart contract previously provided by the cloud management hub. In some embodiments, a point-of-sale terminal may implement the programmatic method to securely transfer the value using solely a cellular network interface on the mobile device.

In some embodiments, a point-of-sale terminal totaling the amount of a purchase to be made at a member merchant facility. A smartphone type device wirelessly discovering and communicating with the point-of-sale terminal. The smartphone type device selecting a locally stored smart contract file to implement a programmatic method to securely transfer value for the purchase. The point-of-sale terminal validating the smartphone type device using public and private key pairs retrieved from a key section of the selected smart contract file.

In some embodiments, the point-of-sale terminal retrieving specific ledger entries, from a blockchain ledger stored in a ledger section of the selected smart contract file, the ledger entries, representing previous implementations of the programmatic method using the selected smart contract file. The point-of-sale terminal validating the selected smart contract file by comparing the received blockchain ledger entries to their corresponding blockchain ledger entries in a locally stored blockchain ledger of all implementations of the programmatic method in a defined geographic region or to a locally stored blockchain ledger of all implementations of the programmatic method across all defined geographic regions.

In some embodiments, the point-of-sale terminal requesting a copy of the validated smart contract file from the smartphone type device. The point-of-sale terminal amending the ledger section of the validated smart contract file to include a blockchain ledger entries of the purchase. The point-of-sale terminal wirelessly transmitting the amended smart contract file to the smartphone type device where it may be locally stored.

In some embodiments, the locally stored blockchain ledger of all implementations of the programmatic method in a defined geographic region. Been wirelessly transmitted over a local private network from an in-store banking server located within the same member merchant facility as the point-of-sale terminal or a remote in-store banking server in wireless range of the local private network. In some embodiments, the locally stored blockchain ledger of all implementations of the programmatic method across all defined geographic regions. Been transmitted over a wide area network from a remote cloud management hub.

In some embodiments, the programmatic method to securely transfer value may involve implementing a business model where change back may be subtracted from a total amount owed back to merchants for stored smart contracts. In some embodiments, the point-of-sale terminal transferring to the cloud management hub a ledger containing all programmatic methods implemented on smart contract files at an individual retail facility. The cloud management hub calculating the total funds owed the individual retail facility based on all smart contract file based purchases documented in the uploaded ledger. The cloud management hub subtraction from the calculated total funds all change assigned to smart contract files documented in the uploaded ledger. The cloud management unit depositing into an account belonging to individual retail facility the total funds calculated that may be owed the individual retail facility based on the uploaded ledger.

The localized smart contract banking system comprises several components. Firstly, a cloud management hub, including a management server and a database, oversees the creation, storage, retrieval, distribution, and verification of smart contract redemption processes linked to mobile devices across individual local banking hubs among a multitude of such hubs.

These local banking hubs, situated at various merchant facilities, include a private wireless network established by an in-store banking server to facilitate communication among neighboring hubs within its network range. Additionally, a local network gateway device within these hubs allows the cloud management hub to communicate with a subset of local banking hubs over a wide area network. Moreover, each hub contains a point-of-sale terminal.

Each local banking hub is designed to coordinate and facilitate the creation of smart contracts using an assembly process. These smart contracts deterministically approve transactions involved in purchasing goods or services at different merchant facilities. This facilitates secure value extraction across a multi-phase value chain. Offline interactions involve reward points and affinity-based value exchange within a private network, while online events entail synchronous activities, ledger updates within the smart contract file, and value transfer in an open-loop manner. In this system, each local banking hub is configured to manage several critical tasks: The primary function involves coordinating and overseeing the creation of smart contracts. These hubs use an assembly process and a deterministic validation mechanism to approve transactions related to the purchase of goods or services across numerous locations at individual merchant facilities. Smart contracts serve as a programmed method enabling secure value extraction throughout a multi-phase value chain. In offline mode, these hubs facilitate interactions, settlement activities, and value extraction using rewards points and affinity-based value exchanges within a private network. Conversely, in online mode, these hubs facilitate synchronous events, manage updates to the ledger section within smart contract files, and execute value transfers in an open-loop manner to ensure fungibility.

Direct communication between the local banking hubs and the point-of-sale terminal occurs via the private wireless network. The point-of-sale terminal validates the type of mobile device using public and private key pairs retrieved from a key section of a smart contract file, consisting of a header section, key section, and ledger section containing ledger entries defining previous individual transactions.

The in-store banking server encompasses a coin and paper money collection unit that collects, stores, and converts currency into cryptographically unique tokens embedded within the smart contract file on the mobile device. These tokens are exclusive to the smart contract banking system and usable only at the point-of-sale terminal as closed-loop points or rewards. Within the in-store banking server, there exists a specialized coin and paper money collection unit designed with specific components: This unit is capable of collecting and securely storing both coins and paper currency. Furthermore, it possesses the capability to convert these physical forms of currency into cryptographically unique tokens. These tokens are embedded and strategically positioned within the smart contract file, which is stored locally on the mobile device. The process involves using a system-wide, updatable master key-certificate specifically designed for the private network or environment. Additionally, this unit is responsible for processing the smart contract file based on individual transactions. The cryptographically unique tokens generated through this process are exclusive and specific to the localized smart contract banking system. These tokens hold their proprietary nature and are designated for exclusive use at the point-of-sale terminal, serving as closed-loop points or rewards value within the system.

A closed-loop system refers to a self-contained operational environment where a designated banking application, along with a mobile device, performs a series of functions independently. The banking application is responsible for managing customer identification data bidirectionally, receiving individual transactions from a point-of-sale terminal, processing these transactions internally, and securely transmitting and receiving identification information to and from a cloud management hub using encryption methods.

The mobile device plays a role within this closed-loop system by locally copying, storing, and transmitting a specific smart contract file associated with a particular banking hub and transaction event. This file functions as a programmatic method allowing the mobile device to execute transactions such as purchasing goods or extracting value from multiple individual merchant facilities. The closed-loop aspect denotes that these actions-customer identification management, transaction processing, and smart contract file utilization-take place within the defined system framework without heavy reliance on external factors or systems beyond its boundaries.

Furthermore, a global positioning unit integrated into the in-store banking server enables the creation of a location-based geo-stamp securely integrated into the smart contract file header. This stamp regulates transaction approval based on geographic parameters, device interactions, and value transfers relative to location and time.

The mobile device has interfaces allowing communication with a local banking hub through the cloud management hub, both synchronously and asynchronously. Its banking application manages customer identification, processes individual transactions received from the point-of-sale terminal, and encrypts data exchanged with the cloud management hub.

The mobile device locally copies, stores, and relays the smart contract file associated with a specific banking hub and transaction event. This file is used programmatically to purchase goods, services, or extract value from multiple merchant facilities in a closed-loop manner.

Finally, the management server, part of the cloud management hub, compares identification information against stored smart contract accounts in the database. Upon validation, it transmits acknowledgment to the mobile device, prompting the customer to log in. If validation fails, it cross-references the information against a Special Designated Nationals List maintained by the Office of Foreign Asset Control (OFAC) and submits a suspect activity report to an authority if necessary.

In an embodiment a cryptographic generation engine sequentially generates and encrypts a device key and a merchant key. The sequentially aggregated keys may be formed into a Quick Response (QR) code and stored in a database. A money key and a third party key may be utilized to advertise. A receipt and/or tag of information may be in the form of a QR code for proof of purchase. This system may utilize Zero Trust Architecture (ZTA) which is a security concept and model centered around the idea that organizations should not automatically trust anything inside or outside their perimeters. This approach challenges the traditional security approach of "trust but verify" by assuming that threats could exist both within and outside the network. ZTA requires continuous authentication and verification of every user, device, and network component attempting to access resources or data, regardless of whether they are within the internal network or outside it. It emphasizes the importance of strict access controls, least privilege access, encryption, continuous monitoring, and micro-segmentation to ensure security.

This system may utilize Two-factor Authentication (2FA) which is an additional layer of security that requires users to provide two different authentication factors before gaining access to a system or application. These factors typically include something the user knows (like a password or PIN) and something the user possesses (such as a mobile device or security token). 2FA significantly enhances security by adding an extra layer of verification beyond just a password, making it harder for unauthorized individuals to gain access to sensitive information or systems.

This system may utilize blockchain, which is a distributed ledger technology that enables secure, transparent, and immutable recording of transactions across a network of computers. It operates on the principles of decentralization, cryptographic hashing, and consensus mechanisms. Each block in the chain contains a record of transactions, and once added, it cannot be altered retroactively without altering all subsequent blocks, making the system tamper-resistant. Blockchain technology may offer this system enhanced security, transparency, and trust in data transactions.

In an embodiment, integrating Zero Trust Architecture (ZTA) principles with Two-factor Authentication (2FA) and blockchain technology may enhance security measures within an this system. ZTA ensures that no access is granted without verification, 2FA provides an additional layer of authentication, and blockchain enhances data integrity and transparency, collectively creating a more robust and secure environment for sensitive data and transactions.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A localized smart contract banking system comprising:

a cloud management hub to administer a smart contract redemption process, the cloud management hub comprising:

a management server; and a database;

an in-store banking server, the in-store banking server comprising a coin and paper money collection unit to collect and store coins and paper currency, the coin and paper money collection unit to convert the coins and the paper currency into cryptographically unique tokens;

a plurality of local banking hubs located at a plurality of individual merchant facilities comprising:

a private wireless network implemented by the in-store banking server for providing communication between the plurality of local banking hubs located at neighboring merchant facilities within a range of the private wireless network;

a local network gateway device installed within the plurality of local banking hubs, wherein the local network gateway device allows the cloud management hub to communicate with a subset of the plurality of local banking hubs over a wide area network; and a point-of-sale terminal;

one or more smart contracts, the one or more smart contracts are generated by each of the plurality of local banking hubs, the one or more smart contracts has a smart contract file comprising:

a header section;

a key section, the key section includes a public key and a private key pair; and a ledger section, the ledger section comprises a hash table populated by ledger entries defining previous individual transactions of the smart contract file, the one or more smart contracts to securely extract value in a multi-phase value chain, where, in an offline mode, interactions, settlement activities and value extraction are done as rewards points and an affinity-based value exchange for a private network and where, in an online mode, synchronous events occur, updates to the ledger section of the smart contract file are made, and value is moved to be made fungible in an open-loop manner;

one or more mobile devices are in communication with one or more individual disparate local banking hubs of the plurality of local banking hubs, each of the plurality of local banking hubs and the point-of-sale terminal communicate directly with the mobile device via the private wireless network, the point-of-sale terminal to validate a type of the one or more mobile devices using the public key and the private key pair retrieved from the key section of the smart contract file;

a master key-certificate, the master key-certificate, via the in-store banking server, to embed and pre-position the cryptographically unique tokens within the smart contract file stored locally on the one or more mobile devices;

a global positioning unit to generate a location based geo-stamp that is securely integrated into the header section of the smart contract file, wherein the location based geo-stamp allows the smart contract file to restrict or grant approval as to where a transaction of the individual transactions based on geo-parameters is permitted to occur, what devices the smart contract file is permitted to interact with, and to whom and from whom value may be transferred relative to location and time;

wherein the global positioning unit generates a GPS key pair into the key section of the smart contract file;

a mobile device of the one or more mobile devices comprising:

a wireless network interface allowing the mobile device to communicate with the one or more individual disparate local banking hubs of the plurality of local banking hubs through the cloud management hub;

a wireless cellular interface allowing the mobile device to communicate with the cloud management hub asynchronously or in both online and offline modes;

and a banking application to manage bidirectional identification information of a customer, the banking application to receive the individual transactions of the smart contract file from the point-of-sale terminal, the banking application to process the individual transactions, the banking application to transmit and receive the identification information to the cloud management hub utilizing encryption methods, and wherein the mobile device locally copies, stores, and relays the smart contract file associated with a specific banking hub of the plurality of local banking hubs and a specific transaction event and used as a programmatic method to purchase the goods and the services or extract value from the plurality of individual merchant facilities in a closed loop manner;

wherein the mobile device operates in an offline mode in which the mobile device is not actively connected to the network or the cloud management hub and stores data locally and performs operations independently without an active connection to the cloud management hub; and wherein the mobile device provides the smart contract file containing the key section including public and private key pairs, and wherein the point-of-sale terminal validates the mobile device using the public and private key pairs retrieved from the key section of the smart contract file;

a management server to compare the identification information against smart contract accounts stored in the database;

wherein the management server transmits an acknowledgment notification and a login prompt to the mobile device if the identification information is validated against an existing account of the smart contract accounts;

wherein the management server generates and transmits a suspect activity report to an authority if the identification information is not validated against the smart contract accounts;

wherein the cloud management hub comprises a key table used to identify which digital currency account is currently being used and to identify customer engagements with previous multimedia advertising events;

wherein, upon transmission of transaction details by the mobile device to the cloud management hub via the cellular communication network of the mobile device, a multimedia-advertising event is delivered from the cloud management hub to the mobile device via either the in-store banking server or the cellular communication network;

wherein once the digital currency account is identified using the key table, an interactive history with previous multimedia advertising events is accessed and a demographic understanding of this history is used to provide unique, discrete, and interactive multimedia advertising events to the mobile device;

wherein the multimedia advertising event, a coupon, or a voucher interacts with a user pausing, tagging, or labeling a product, swiping right or left to indicate interest or disinterest, or by clicking, shaking, holding, or tapping one or more buttons on the mobile device to indicate relevance or irrelevance;

wherein interaction data is saved and compartmentalized for each smart contract account and used to generate increasingly targeted and unique multimedia advertising events; and wherein the interactive advertising process is cyclical in nature and allows users of the in-store banking server and embedded applications to curate their own advertisements through continued participation, thereby modifying the multimedia advertising events for each individual user.

2. The localized smart contract banking system of claim 1, wherein the in-store banking server further comprises:

an interactive unit comprising components necessary to communication with the mobile device and to process the transactions involved in the purchase of the goods and the services at the plurality of individual merchant facilities using the smart contract as the programmatic method, wherein the components comprise at least a central processing unit, a memory, and a secure local storage;

a sensor unit comprising components necessary to enable wireless communication over a closed and private wireless network between the in-store banking server and the mobile device within the range of the private wireless network;

and a power supply unit.

3. The localized smart contract banking system of claim 1, wherein the header section includes at least a time-stamp identifying a local time when the smart contract file was last accessed.

4. The localized smart contract banking system of claim 3, wherein the header section further includes any other uniquely identifiable information relevant to that smart contract's provenance, or history, including whose custody the smart contract may now be in or may have been at one time.

5. The localized smart contract banking system of claim 1, wherein the key section comprises at least a phone key pair that enables and identifies processing of the smart contract on the mobile device and a master public key component that enables validation of the smart contract on the mobile device.

6. The localized smart contract banking system of claim 5, wherein the key section further comprises any portion, subset, or combination of the phone key pair selected from the group consisting of:

a point-of-sale terminal key pair that enables and identifies processing of a specific smart contract on the point-of-sale terminal;

a global positioning key pair that enables and identifies the processing of the specific smart contract conditioned on location information;

a third-party key pair that enables and identifies the processing of the specific smart contract by an individual merchant facility of the plurality of individual merchant facilities;

a value add and subtract key pair that enables processing of the specific smart contract to add and subtract a monetary retail value assigned to the specific smart contract; and a partner key pair that enables validation and identification of the individual merchant facility of the plurality of individual merchant facilities identified as specific retail partner.

7. The localized smart contract banking system of claim 1, wherein the individual smart contract transactions comprise those performed using a specific smart contract file on the mobile device.

8. The localized smart contract banking system of claim 1, wherein each of the plurality of local banking hubs and the cloud management hub store the smart contract, and wherein the ledger section of the smart contract comprises all transactions with a defined geographic area.

9. The localized smart contract banking system of claim 8, wherein the point-of-sale terminal implements the programmatic method using the smart contract from the mobile device and a locally stored copy of the smart contract previously provided by the local banking hub of the plurality of local banking hubs or a copy of the smart contract previously provided by the cloud management hub.

10. The localized smart contract banking system of claim 9, wherein the point-of-sale terminal implements the programmatic method to securely transfer the value using solely a cellular network interface on the mobile device.

11. A method for implementing a localized smart contract banking system, the method steps comprising:

a point-of-sale terminal totaling an amount of a purchase to be made at a member merchant facility;

a smartphone type device wirelessly discovering and communicating with the point-of-sale terminal using a private wireless network implemented by an in-store banking server, wherein the smartphone type device operates in an offline mode without requiring real-time access to a centralized server;

the smartphone type device selecting a locally stored smart contract file to implement a programmatic method to securely transfer value for the purchase, wherein the smart contract file comprises a header section, a key section, and a ledger section, and wherein the smart contract file comprises cryptographically unique tokens embedded within the smart contract and a geo-stamp identifying a location associated with the smart contract file, the geo-stamp enabling processing of the smart contract conditioned on geographic information and restricting or granting approval of a transaction based on geographic parameters;

the point-of-sale terminal validating the smartphone type device using public and private key pairs retrieved from a key section of the selected smart contract file, including validating a master public key, a partner key, and a geo-specific key associated with a transaction location;

the point-of-sale terminal retrieving specific ledger entries, from a blockchain ledger stored in a ledger section of the selected smart contract file, the ledger entries, representing previous implementations of the programmatic method using the selected smart contract file;

the point-of-sale terminal validating the selected smart contract file by comparing the received blockchain ledger entries to their corresponding blockchain ledger entries in a locally stored blockchain ledger of all implementations of the programmatic method in a defined geographic region or to a locally stored blockchain ledger of all implementations of the programmatic method across all defined geographic regions, wherein the blockchain comparison is performed by a local node validation module reconciles transactions in a disconnected or asynchronous mode;

the point-of-sale terminal requesting a copy of the validated smart contract file from the smartphone type device;

the point-of-sale terminal amending the ledger section of the validated smart contract file to include a blockchain ledger entries of the purchase, including updating a local hash value corresponding to the amended ledger entry and generating a timestamp and geo-stamp identifying the merchant location and time of transaction; and the point-of-sale terminal wirelessly transmitting the amended smart contract file to the smartphone type device where it is locally stored, and subsequently synchronizing the amended smart contract file with an in-store banking server or cloud management hub upon re-establishing connectivity to update the ledger entry and reconcile merchant settlement.

12. The method for implementing a localized smart contract banking system of claim 11 wherein the locally stored blockchain ledger of all implementations of the programmatic method in a defined geographic region has been wirelessly transmitted over a local private network from an in-store banking server located within the same member merchant facility as the point-of-sale terminal or a remote in-store banking server in wireless range of the local private network.

13. The method for implementing a localized smart contract banking system of claim 11 wherein the locally stored blockchain ledger of all implementations of the programmatic method across all defined geographic regions has been transmitted over a wide area network from a remote cloud management hub.

14. The method for implementing a localized smart contract banking system of claim 11 wherein the programmatic method to securely transfer value involves implementing a business model where change back is subtracted from a total amount owed back to merchants for stored smart contracts.

15. The method for implementing a localized smart contract banking system of claim 11 further comprising:

the point-of-sale terminal transferring to the cloud management hub a ledger containing all programmatic methods implemented on smart contract files at an individual retail facility;

the cloud management hub calculating the total funds owed the individual retail facility based on all smart contract file based purchases documented in the uploaded ledger;

the cloud management hub subtraction from the calculated total funds all change assigned to smart contract files documented in the uploaded ledger; and the cloud management hub depositing into an account belonging to individual retail facility the total funds calculated that are owed the individual retail facility based on the uploaded ledger.

* * * * *